(12) United States Patent
Akahane et al.

(10) Patent No.: US 7,922,333 B2
(45) Date of Patent: Apr. 12, 2011

(54) PROJECTOR, SCREEN, PROJECTOR SYSTEM, AND SCINTILLATION REMOVING APPARATUS FOR REMOVING SCINTILLATION ON AN IMAGE DISPLAY USING A VIBRATION GENERATING UNIT

(75) Inventors: Hidehiro Akahane, Matsumoto (JP); Eiji Morikuni, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1020 days.

(21) Appl. No.: 11/740,619

(22) Filed: Apr. 26, 2007

(65) Prior Publication Data

US 2007/0251916 A1   Nov. 1, 2007

(30) Foreign Application Priority Data

Apr. 27, 2006   (JP) .................. 2006-123405

(51) Int. Cl.
*G03B 21/26*   (2006.01)
(52) U.S. Cl. ........... 353/30; 359/446; 359/452; 359/453
(58) Field of Classification Search ............ 353/30, 353/46, 69, 122; 359/446, 452, 453
See application file for complete search history.

(56) References Cited

U.S. PATENT DOCUMENTS

| | | | |
|---|---|---|---|
| 4,390,239 A | 6/1983 | Huber | |
| 6,317,169 B1 | 11/2001 | Smith | |
| 6,426,836 B2 * | 7/2002 | Dorsel et al. | 359/443 |
| 6,483,643 B1 * | 11/2002 | Zuchowski | 359/443 |
| 2004/0006409 A1 * | 1/2004 | Liljenberg et al. | 700/266 |
| 2004/0182979 A1 * | 9/2004 | Krzoska et al. | 248/316.8 |
| 2006/0126022 A1 * | 6/2006 | Govorkov et al. | 353/31 |
| 2007/0052638 A1 * | 3/2007 | May et al. | 345/84 |
| 2007/0273849 A1 * | 11/2007 | Takeda | 353/122 |

FOREIGN PATENT DOCUMENTS

| | | |
|---|---|---|
| JP | A-55-065940 | 5/1980 |
| JP | U 59-020227 | 2/1984 |
| JP | A 63-231325 | 9/1988 |
| JP | A 08-160448 | 6/1996 |
| JP | A 2001-350196 | 12/2001 |
| JP | A 2002-543455 | 12/2002 |
| JP | A 2003-098476 | 4/2003 |
| JP | A 2003-262920 | 9/2003 |
| JP | A 2004-144936 | 5/2004 |

* cited by examiner

*Primary Examiner* — Georgia Y Epps
*Assistant Examiner* — Kevin Wyatt
(74) *Attorney, Agent, or Firm* — Oliff & Berridge, PLC

(57) ABSTRACT

A projector includes a light diffusing unit that is vibratably provided to diffuse incident light by a vibration and to emit diffused light, the light diffusing unit having a unique resonance frequency, a vibration generating unit that has a piezoelectric element for vibrating the light diffusing unit, and a control unit that controls the vibration generating unit to vibrate the light diffusing unit at a frequency corresponding to the unique resonance frequency of the light diffusing unit. An image is displayed using the diffused light emitted from the light diffusing unit.

19 Claims, 16 Drawing Sheets

PROJECTOR, SCREEN, PROJECTOR SYSTEM, AND SCINTILLATION REMOVING APPARATUS FOR REMOVING SCINTILLATION ON AN IMAGE DISPLAY USING A VIBRATION GENERATING UNIT

This application claims the benefit of Japanese Patent Application No. 2006-123405, filed in the Japanese Patent Office on Apr. 27, 2006. The entire disclosure of the prior application is hereby incorporated by reference herein in its entirety.

BACKGROUND

1. Technical Field

Embodiments of the present invention include a projector, a screen, a projector system, and a scintillation removing apparatus. In particular, an embodiment of the invention relates to a projector that includes a mechanism for removing scintillation to be generated upon image display 2. Related Art There is known a projector that illuminates a spatial light modulator, such as a liquid crystal light valve or the like, with a light source, and projects image light modulated by the spatial light modulator on a screen using a projection optical system, such as a projection lens or the like, on magnified scale. In such a projector, when display is performed on the basis of image light, light interference may occur in a scatterer, such as the screen or the like. Accordingly, a phenomenon that bright and dark points are distributed in stripe or spot patterns, so-called scintillation (or speckle), may occur.

Scintillation is a factor having a bad effect, for example, in causing an observer to feel a feeling of irregularity and causing inconvenience when the observer views images. Particularly, since laser light has high interference. scintillation may easily occur. In recent years, even in a lamp light source, wit the improvement of short arc, interference becomes high, and a technology for removing scintillation becomes important. In a related art laser projection type display device, a light diffuser, such as a holographic light diffuser, is interposed between a laser light source and a spatial light modulator. Then, the light diffuser moves linearly, circularly, or randomly by a motion applying unit, such as an electric motor or the like, thereby removing scintillation. This technology has been suggested in JP-A-2003-98476. This technology moves the light diffuser to dynamically change a speckle pattern (interference pattern) such that the speckle pattern is not caught by a human's eye.

In the technology disclosed in JP-A-2003-98476, as the motion applying unit of the light diffuser, an electric motor, a vibrating motor, and a linear actuator are exemplified. However, these units have a problem in that responsibility in moving the light diffuser at high speed is lacking. Further, in view of vibration or noise, power consumption, and the like, many problems exist. In addition, it is rarely put to practical use. Accordingly, even though the above technology is used, scintillation may not be effectively removed, and a user may not feet satisfaction in view of practicality.

SUMMARY

Exemplary embodiments of the invention include a projector, a screen, a projector system, and a scintillation removing apparatus that can effectively remove scintillation and have excellent practicality in view of vibration or noise, power consumption, and the like.

According to a first exemplary embodiment, a projector includes a light diffusing unit that is vibratably provided to diffuse incident light by a vibration and to emit diffused light, a vibration generating unit that has a piezoelectric element for vibrating the light diffusing unit by its vibration, and a control unit that controls the vibration generating unit to vibrate the light diffusing unit at a frequency corresponding to a unique resonance frequency of the light diffusing unit. An image is displayed using light emitted from the light diffusing unit. Moreover, in regards to the vibration of the light diffusing unit, various vibration modes, such as vertical vibration, widthwise vibration, bending vibration, and the like, may be exemplified. The term 'resonance frequency' used herein may be a resonance frequency of one of a plurality of vibration modes.

The projector according to the first exemplary embodiment has a basic principle that vibrates the light diffusing unit to change a phase of light, thereby reducing light interference and removing scintillation. In a known configuration, an electric motor is used to move a light diffuser. However, in the first exemplary embodiment, the piezoelectric element is used in the vibration generating unit that vibrates the light diffusing unit. In general, since the piezoelectric element has excellent high-speed responsibility compared with the electric motor, in the projector according to the first exemplary embodiment, with the piezoelectric element, scintillation can be effectively removed. Further, when the piezoelectric element is used, the vibration generating unit can be configured with a small number of parts, and thus the vibration generating unit becomes compact and simplified. Therefore, excellent silence, power saving, and durability can be realized. Further, the vibration form of the light diffusing unit can be changed with the piezoelectric element, and thus a frequency at which the light diffusing unit vibrates can be reduced. Therefore, high silence and low power consumption can be realized and reliability can be improved.

The projector according to the first exemplary embodiment includes a control unit that controls a vibration generating unit and causes the vibration generating unit to vibrate a light diffusing unit at the frequency corresponding to the unique resonance frequency of the light diffusing unit. Accordingly, even though energy of the same level is applied to drive the vibration generating unit, the amplitude of the light diffusing unit can be increased, compared with a case where the vibration generating unit is driven without taking the frequency into account. As a result, according to a first exemplary embodiment, scintillation can be more reliably removed. Meanwhile, energy required for allowing the light diffusing unit to obtain a desired amplitude can be reduced, and thus low power consumption can be realized.

In the projector according to a first exemplary embodiment, a single vibration generating unit or a plurality of vibration generating units may be provided.

When a plurality of vibration generating units are provided, the amplitude of the light diffusing unit can be easily increased, and thus scintillation can be reliably removed. Further, if the size, arrangement or direction (vibration direction), and application voltage of each vibration generating unit are appropriately selected, the light diffusing unit can be directed to vibrate in a desired direction at a desired amplitude, and thus vibration optimization can be easily achieved. Accordingly, a degree of reduction in scintillation, that is, sharpness of a display image can be controlled.

In a projector according to the first exemplary embodiment, at least two vibration generating units may be provided, and vibration directions of the two vibration generating units may be perpendicular to each other within a principal plane of the light diffusing unit.

When a plurality of vibration generating units are provided, if the two vibration generating units are disposed such that the vibration directions thereof are perpendicular to each other within the principal plane of the light diffusing unit, the vibration can be generated in all directions within the principal plane of the light diffusing unit.

As a specific configuration for generating the vibration, the light diffusing unit may have a frame that is vibratable in a first direction, and a light diffusing unit main body that is vibratable in a second direction perpendicular to the first direction and relatively with respect to the frame. In this case, vibration generating units that respectively vibrate the frame and the light diffusing unit main body may be provided.

According to this configuration, what is necessary is that each vibration generating unit is in charge of the vibration at the resonance frequency relative to the vibration of each direction. Therefore, the vibration at the resonance frequency within the principal plane of the light diffusing unit can be easily achieved.

When a plurality of vibration generating units are provided, driving signals having waveforms out of phase may be respectively input to the piezoelectric elements of at least two vibration generating units among the plurality of vibration generating units.

According to this configuration, the light diffusing unit performs a circular motion (an orbit may be a round or an ellipse) within the principal plane. Unlike a linear reciprocation, in case of the circular motion, since a period in which the motion of the light diffusing unit stops is eliminated, scintillation is rarely viewed.

When excitation frequencies of the two piezoelectric elements, to which the driving signals having waveforms out of phase are input, are f1 and f2, respectively, the relationship $f1 = n \times f2$ (where n is a natural number of 1 or more) may be satisfied.

If the excitation frequency f1 of one of the two piezoelectric elements is set to be n times as large as the excitation frequency f2 of the other piezoelectric element, a state where the two driving signals are out of phase is constantly kept. Accordingly, the circular motion is continuously performed, and there is no case where the motion stops. Therefore, a period in which the motion of the light diffusing unit stops and scintillation is viewed does not occur.

The light diffusing unit may have a plurality of resonance frequencies corresponding to different vibration modes. In this case, the plurality of resonance frequencies may be approximately the same.

According to this configuration, the light diffusing unit vibrates at frequencies corresponding to a plurality of resonance frequencies that are approximately the same, and thus vibrations in different vibration modes arise simultaneously. Accordingly, the circular motion is easily generated. Moreover, 'the resonance frequencies are approximately the same' means that a difference between the resonance frequencies is less than 10%. The inventors have found that, if the difference between the resonance frequencies is at least less than 10%, the vibrations in different vibration modes arise simultaneously.

The unique resonance frequency of the light diffusing unit may be 20 kHz or more.

In general, it is said that the vibration of 20 kHz or more exceeds the range of hearing of the human. For this reason, according to this configuration, even though the light diffusing unit vibrates to remove scintillation, noise by the vibration is not generated.

The light diffusing unit may be provided to be rotatable with a support member as a fulcrum, and the support member may be disposed at a position where a vibration node of the light diffusing unit is disposed.

In order to form the light diffusing unit to be vibratable, the light diffusing unit may be supported on a projector or a casing of an optical engine through the support member. Then, the light diffusing unit vibrates with the support member as a fulcrum. At this time, if the support member is disposed at the position where the vibration node of the light diffusing unit is disposed, the support member does not interfere with the vibration, and the amplitude can be increased.

As an example of the installment of the vibration generating unit, the vibration generating unit may have a fixed end outside of the light diffusing unit, and a vibration may be applied from the vibration generating unit outside the light diffusing unit to the light diffusing unit.

According to this configuration, the light diffusing unit coercively vibrates externally. This is suitably applied when there is no space in the light diffusing unit itself where the vibration generating unit is installed.

Alternatively, the vibration generating unit may be provided close to a light incident surface and a light emergent surface of the light diffusing unit, not having a fixed end outside the light diffusing unit, and the entire light diffusing unit may vibrate by a vibration of the piezoelectric element.

According to this configuration, a space in the light diffusing unit itself for installing the vibration generating unit is needed, but an externally coercive vibration is not generated. Accordingly, only tie support of the light diffusing unit is needed. That is, a support of the vibration generating unit does not need to be provided.

According to a second exemplary embodiment, a screen includes a light diffusing unit that is vibratably provided to diffuse incident light by a vibration and to emit diffused light, a vibration generating unit that has a piezoelectric element for vibrating the light diffusing unit by its vibration, and a control unit that controls the vibration generating unit to vibrate the light diffusing unit at a frequency corresponding to a unique resonance frequency of the light diffusing unit.

The configuration for removing scintillation according to the second exemplary embodiment can be applied to a screen alone. In this case, with the piezoelectric element, scintillation can also be effectively removed. Therefore, the same effects as those described above, that is, excellent silence, power saving, and durability, can be obtained.

According to a third exemplary embodiment, a projector system includes the above-described screen, and a projector main body that projects image light on the screen.

According to this configuration, a projector system that can effectively remove scintillation and has excellent silence, power saving, and durability can be realized.

According to a fourth exemplary embodiment, a scintillation removing apparatus includes a light diffusing unit that is vibratably provided to diffuse incident light by a vibration and to emit diffused light, a vibration generating unit that has a piezoelectric element for vibrating the light diffusing unit by its vibration, and a control unit that controls the vibration generating unit to vibrate the light diffusing unit at a frequency corresponding to a unique resonance frequency of the light diffusing unit.

According to this configuration, a scintillation removing apparatus that can effectively remove scintillation and has excellent silence, power saving, and durability can be realized.

BRIEF DESCRIPTION OF THE DRAWINGS

Exemplary embodiments of the invention will be described with reference to the accompanying drawings, wherein like numbers reference like elements.

DESCRIPTION OF EXEMPLARY EMBODIMENTS

First Exemplary Embodiment hereinafter, a first exemplary embodiment will be described with reference to FIGS. 1 to 10.

The first exemplary embodiment relates to a rear type projector. In particular, an example where a scintillation removing apparatus is incorporated into an optical engine of a rear type projector is described.

Figure 1:
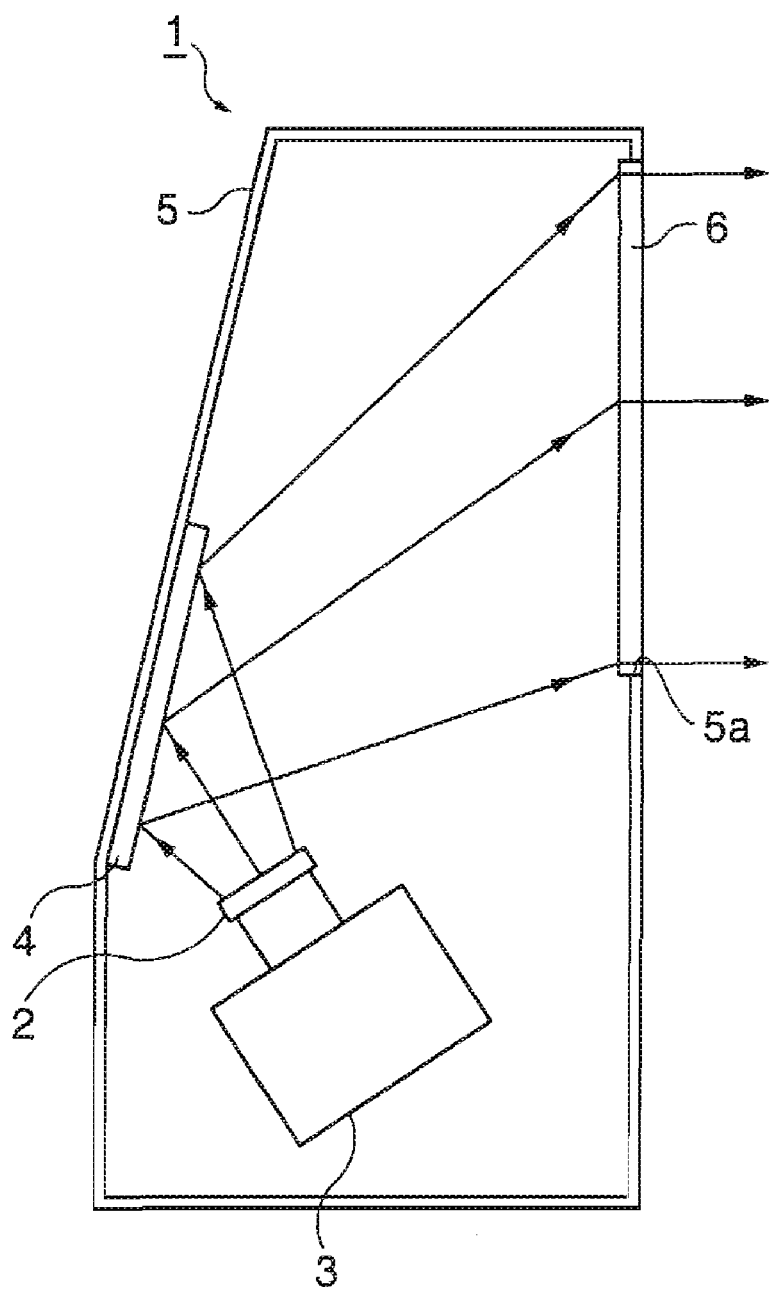
FIG. 1 is a schematic block diagram of a rear type projector according to a first exemplary embodiment.
Figure 2:
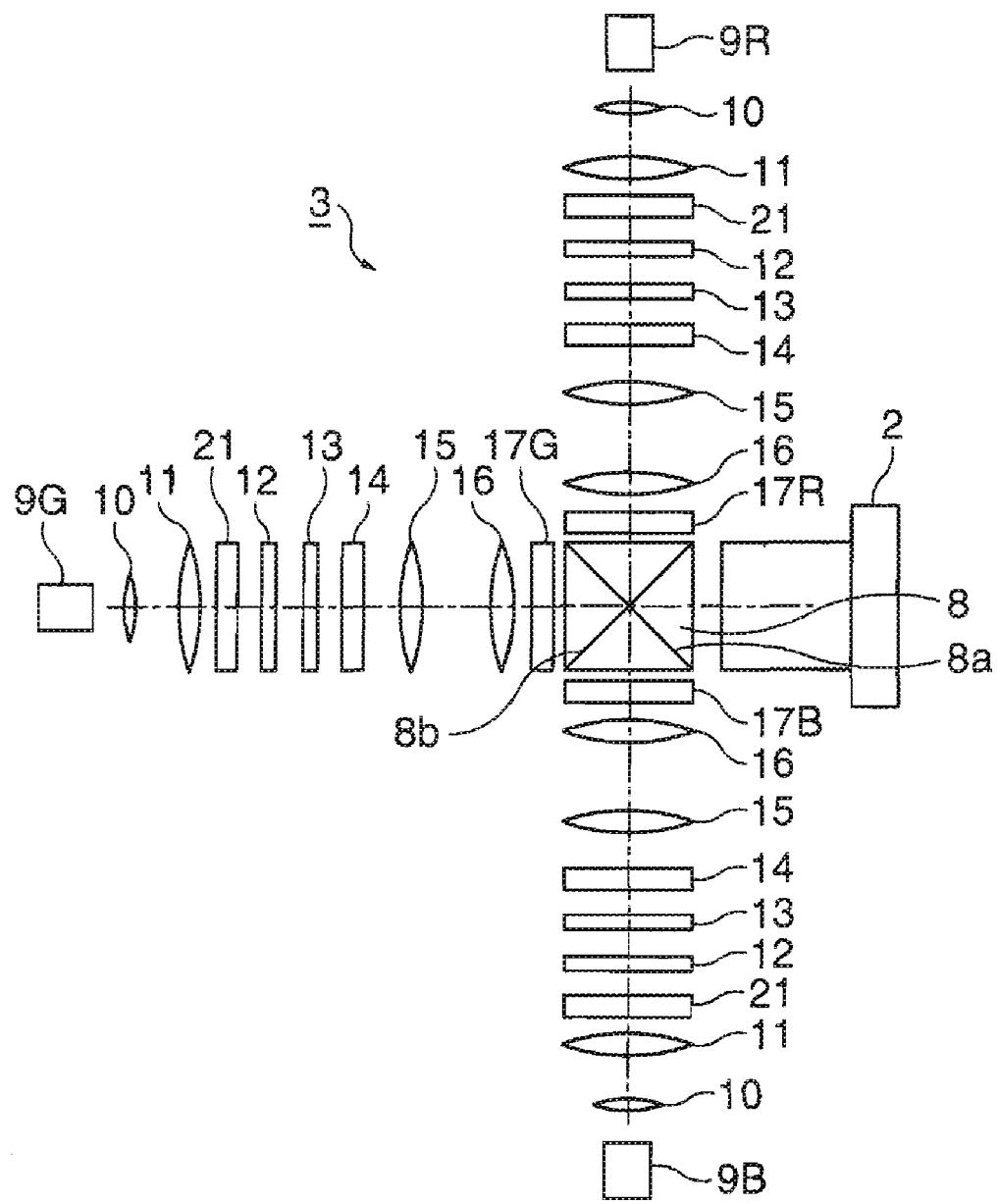
FIG. 2 is a schematic block diagram showing an optical engine unit of the rear type projector according to the first exemplary embodiment.
Figure 3:
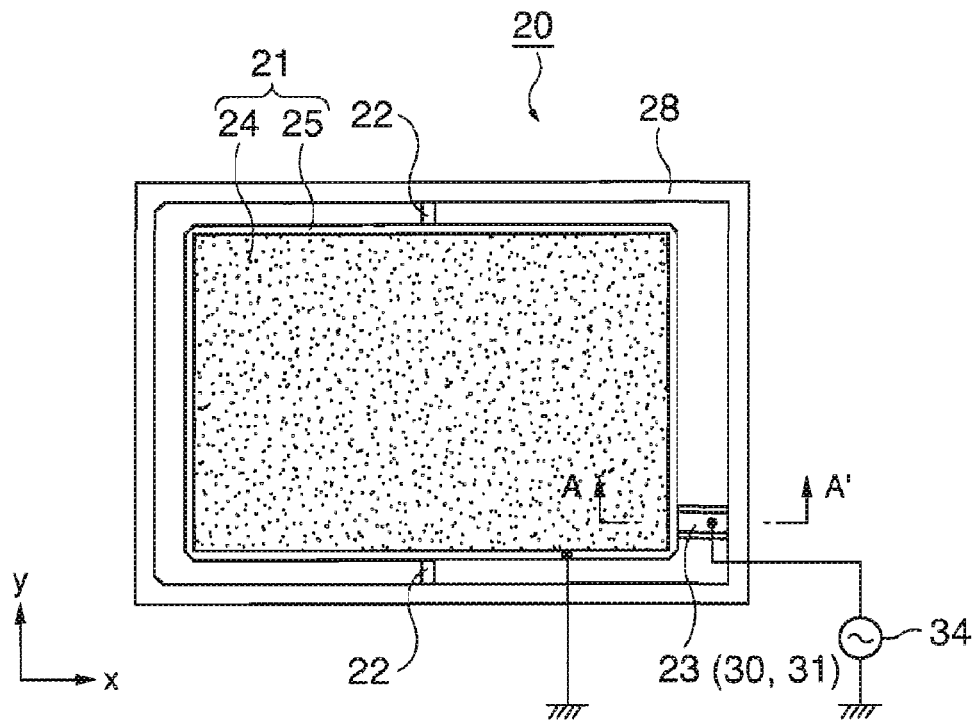
FIG. 3 is a plan view showing a scintillation removing apparatus in an optical engine unit according to the first exemplary embodiment.
Figure 4:
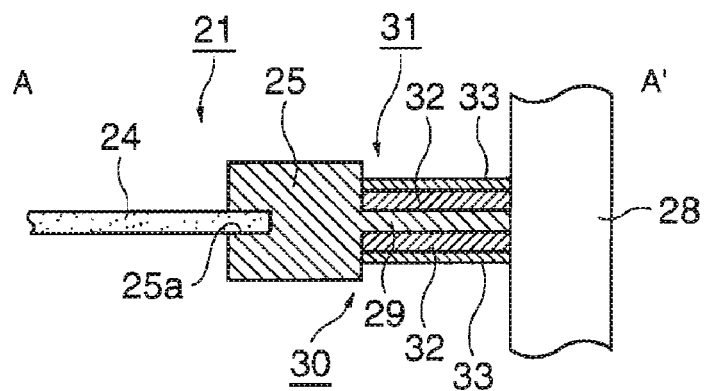
FIG. 4 is a cross-sectional view taken along the line A-A' of FIG. 3.
Figure 5:
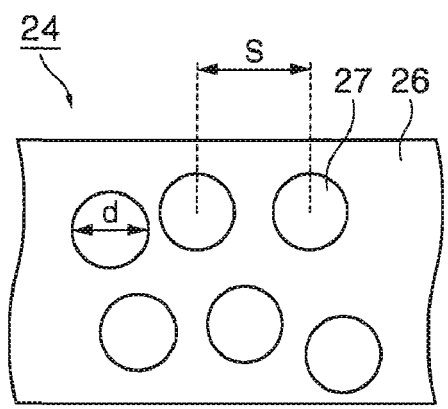
FIG. 5 is a plan view showing a portion of a diffusing plate of the scintillation removing apparatus according to the first exemplary embodiment.
Figure 6:
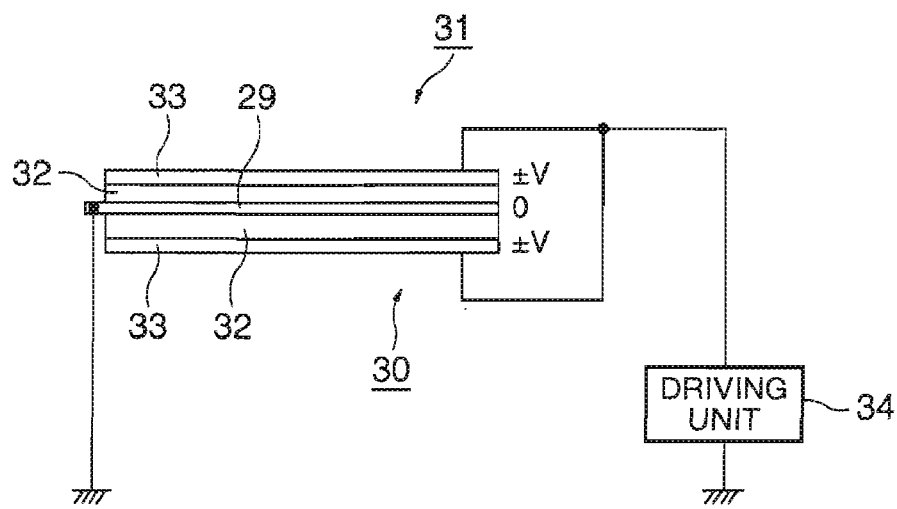
FIG. 6 is a diagram illustrating the operation of a vibration generating unit of an apparatus according to the first exemplary embodiment.
Figure 7:
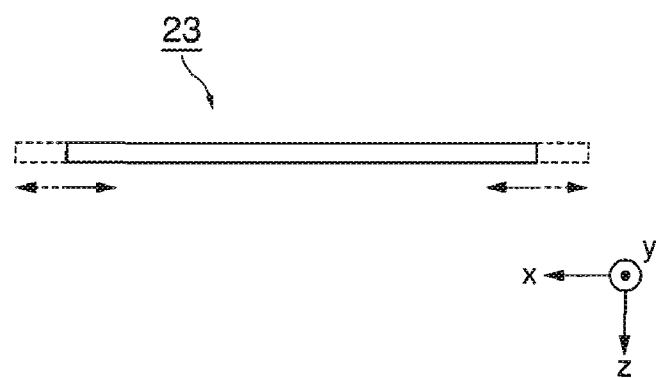
FIG. 7 is a diagram illustrating a vertical vibration of a vibration generating unit according to the first exemplary embodiment.
Figure 8:
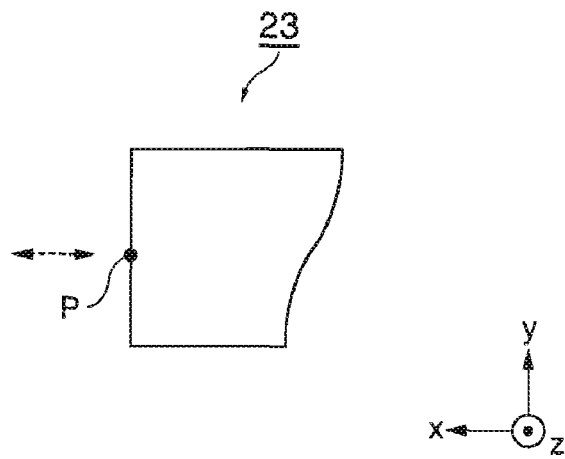
FIG. 8 is a diagram illustrating a displacement of a vibration generating unit upon the vertical vibration according to the first exemplary embodiment.
Figure 9:
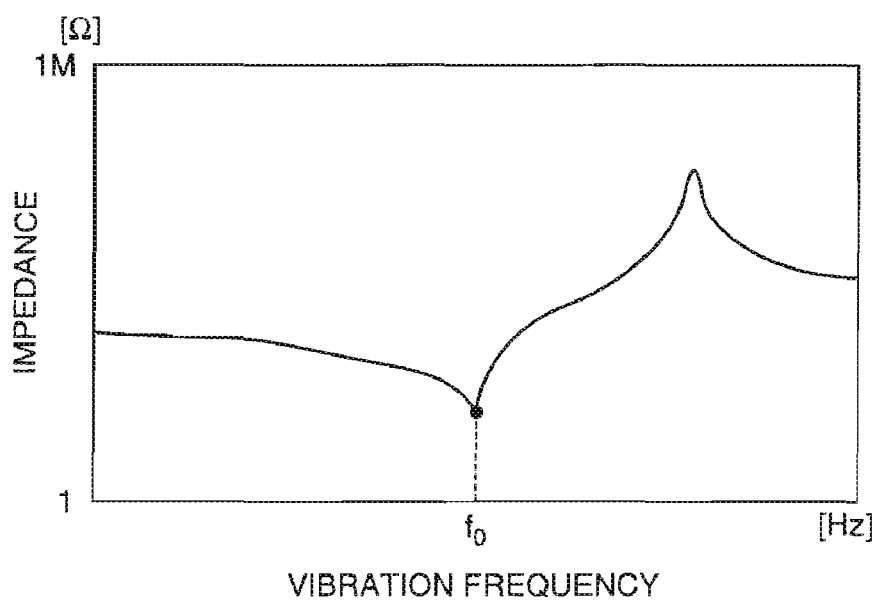
FIG. 9 is a diagram showing the relationship between a vibration frequency of a light diffusing unit and impedance according to the first exemplary embodiment.
Figure 10:
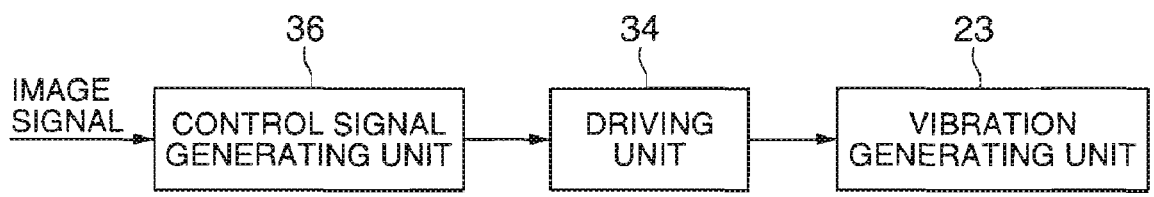
FIG. 10 is a block diagram showing a control unit of a vibration generating unit according to the first exemplary embodiment.

FIG. 1 is a schematic block diagram of a rear type projector according to a first exemplary embodiment. FIG. 2 is a schematic block diagram showing an optical engine unit of a rear type projector according to the first exemplary embodiment. FIG. 3 is a plan view showing a scintillation removing apparatus in the optical engine unit according to the first exemplary embodiment. FIG. 4 is a cross-sectional view taken along the line A-A' of FIG. 3, particularly, a cross-sectional view showing a constitution of a vibration generating unit. FIG. 5 is a plan view showing a portion of a diffusing plate of a scintillation removing apparatus according to the first exemplary embodiment. FIG. 6 is a diagram illustrating the operation of a vibration generating unit according to the first exemplary embodiment. FIG. 7 is a diagram illustrating a vertical vibration of a vibration generating unit according to the first exemplary embodiment. FIG. 8 is a diagram illustrating a displacement of a vibration generating unit upon the vertical vibration according to the first exemplary embodiment. FIG. 9 is a diagram showing the relationship between a vibration frequency of a light diffusing unit and impedance according to the first exemplary embodiment. FIG. 10 is a block diagram showing a control unit of a vibration generating unit according to the first exemplary embodiment.

Moreover, in all the drawings, the scale of each member has been adjusted in order to have a recognizable size.

In a rear type projector (projector) 1 of this embodiment, as shown in FIG. 1, an optical engine unit 3 having a projection lens 2 and a mirror 4 are housed in a casing 5, and a screen 6 is fitted into an opening 5a provided in a portion of the casing 5. The optical engine unit 3, into which a spatial light modulation device described below is incorporated, emits light (image light) modulated according to an image signal. The projection lens 2 projects light emitted from the optical engine unit 3 toward the mirror 4 on magnified scale. The mirror 4 is provided at a rear surface inside the casing 5 to reflect light emitted from the optical engine unit 3 and bend an optical path toward the screen 6. The mirror 4 is formed, for example, by forming a reflecting film on a parallel flat plate. As the reflecting film, a material having high reflectance, for example, a metal film of aluminum or the like, a multilayer dielectric film, or the like, may be used.

The screen 6 is a known transmissive screen that transmits light emitted from the optical engine unit 3. The screen 6 transmits light projected from a rear side and emits light to a front side. Further, the screen 6 has an angle converting unit (not shown) that converts an angle of light incident obliquely from the mirror 4 toward a front surface of the rear type projector 1 (toward an observer). As the angle converting unit, for example, a lenticular lens array, a micro lens arrays or a diffusing plate having distributed therein a diffusing material that diffuses light may be used. A user observes light emitted from a front surface of the screen 6 to view an image.

Next, the details of the optical engine unit 3 will be described.

As shown in FIG. 2, in the optical engine unit 3, image light for red, green, and blue units is generated and the color light components are synthesized by a color synthesizing prism (a cross dichroic prism 8). Then, synthesized light is incident on the projection lens 2. For this reason, three units that respectively generate image light of the individual colors have the common configuration. Here, a description will be given by way of a unit that generates red image light.

As for the units of a red light component, a red light source unit 9R, a divergent lens 10, a collimator lens 11, a light diffusing unit 21, a first integrator lens 12, a second integrator lens 13, a polarization conversion element 14, a superimposing lens 15, a field lens 16, and a red spatial light modulation device 17R are sequentially disposed from the red light source unit 9R to the cross dichroic prism 8. In this exemplary embodiment, the red light source unit 9R is a semiconductor laser that oscillates red laser light. Red light emitted from the red light source unit 9R diverges by the divergent lens 10 and is parallelized by the collimator lens 11. Light emitted from the collimator lens 11 transmits the light diffusing unit 21 of a scintillation removing apparatus described below and then transmits the first integrator lens 12 and the second integrator lens 13.

Each of the first integrator lens 12 and the second integrator lens 13 is a lens array having a plurality of lens elements arranged in an array, a so-called fly eye lens. The first integrator lens 12 divides a light flux from the red light source unit 9R into a plurality of light fluxes, and each of the lens elements constituting the first integrator lens 12 collects the light fluxes from the red light source unit 9R to the vicinities of the lens elements of the second integrator lens 13. Each of the lens elements constituting the second integrator lens 13 focuses an image by each the lens elements of the first integrator lens 12 on the red spatial light modulation device 17R.

The polarization conversion element 14 has a polarization beam splitter and a half-wave plate. The polarization conversion element 14 converts light in a random polarization state emitted from the red light source unit 9R into polarized light having a specific vibration direction. Accordingly, light that passes through the two integrator lenses 12 and 13 is converted into polarized light having a specific vibration direction by the polarization conversion element 14, for example, s polarized light. The superimposing lens 15 superimposes the image by each of the lens elements of the first integrator lens 12 on the red spatial light modulation device 17R. The first integrator lens 12, the second integrator lens 13, and the superimposing lens 15 constitute an intensity uniformizing unit that uniformizes an intensity distribution of light from the red light source unit 9R on the red spatial light modulation device 17R. The field lens 16 parallelizes red light from the superimposing lens 15 and causes parallel light to be incident on the red spatial light modulation device 17R.

The red spatial light modulation device 17R has a transmissive liquid crystal light valve that modulates incident red light according to an image signal. The liquid crystal light valve (not shown) provided in the red spatial light modulation device 17R has a configuration in which a liquid crystal layer is sealed between two transparent substrates. Polarizing plates (not shown) are disposed on an incident side and an emergent side of the liquid crystal light valve. In the incident-side polarizing plate of the liquid crystal light valve, a polarization axis (transmission axis) is disposed such that polarized light converted by the polarization conversion element 14 (for example, s polarized light) transmits. Meanwhile, in the emergent-side polarizing plate of the liquid crystal light valve, a polarization axis is disposed perpendicular to the polarization axis of the incident-side polarizing plate, for example, it is disposed such that p polarized light transmits. Accordingly, s polarized light incident on the liquid crystal light valve is converted into p polarized light by modulation according to the image signal and then red light is emitted (bright display). Alternatively, s polarized light is absorbed by the emergent-side polarizing plate as it is (dark display). Red light modulated by the red spatial light modulation device 17R is incident on the cross dichroic prism 8 serving as a color synthesizing optical system.

Hereinafter, the units that respectively generate green and blue image light components will be simply described. Moreover, the same parts as those in the units of the red light component are represented by the same reference numerals, and the descriptions thereof will be omitted.

A green light source unit 9G is a semiconductor laser that oscillates green laser light. Like red light, green light from the green light source unit 9G passes through individual optical elements from a divergent lens 10 to a field lens 16 and then is incident on a green spatial light modulation device 17G. The green spatial light modulation device 17G is a transmissive liquid crystal light valve that modulates green light according to the image signal. s polarized light incident on the green spatial light modulation device 17G is converted into p polarized light through modulation by the liquid crystal light valve to be then emitted or is absorbed by an emergent-side polarizing plate to be not emitted. Green light modulated by the green spatial light modulation device 17G is incident on the cross dichroic prism 8.

A blue light source unit 9B is a semiconductor laser that oscillates blue laser light. Like red light, blue light from the blue light source unit 9B passes through individual optical elements from a divergent lens 10 to a field lens 16 and then is incident on a blue spatial light modulation device 17B. The blue spatial light modulation device 17B is a transmissive liquid crystal light valve that modulates blue light according to the image signal. s polarized light incident on the blue spatial light modulation device 17B is converted into p polarized light through modulation by the liquid crystal light valve to be then emitted or is absorbed by an emergent-side polarizing plate to be not emitted. Blue light modulated by the blue spatial light modulation device 17B is incident on the cross dichroic prism 8.

The cross dichroic prism 8 has two dichroic films 8a and 8b that are disposed substantially perpendicular to each other. The first dichroic film 8a reflects the red light components and transmits the green and blue light components. Meanwhile, the second dichroic film 8b reflects the blue light component and transmits the red and green light components. With the two dichroic films 8a and 8b, the cross dichroic prism 8 can synthesize the red, green, and blue light components incident from different directions and emit synthesized light toward the projection lens 2.

Moreover, in each of the light source units 9R, 9G, and 9B of the individual color light components, a waveform conversion element that converts a waveform of laser light from the semiconductor laser, for example, a second harmonic generation (SHG) element may be provided. In this case, as the light source unit, light subjected to waveform conversion with laser light from the semiconductor laser as an oscillating source is emitted. Further, for the light source unit, instead of the semiconductor laser, a DPSS (Diode Pumped Solid State) laser, a solid laser, a liquid laser, or a gas laser may be used.

Next, a configuration of a scintillation removing apparatus 20 will be described.

As shown in FIG. 3, the scintillation removing apparatus 20 has a light diffusing unit 21, supports 22, and a vibration generating unit 23. The light diffusing unit 21 has a rectangular diffusing plate 24, and a rectangular ring-shaped diffusing plate frame 25 that holds the periphery of the diffusing plate 24. As shown in FIG. 5, in the diffusing plate 24, diffusing material particles 27 having a different refractive index from a transparent member 26 are distributed in the transparent member 26. The diffusing plate 24 is a transmissive diffusing plate that, when light transmits, diffuses light (forward scattering property). In order to obtain a large diffusing effect with a small vibration from the diffusing plate 24, it is preferable that the diameter d of the diffusing material particles 27 distributed in the transparent member 26 be as small as possible, for example, in a range of approximately 0.01 mm to 0.1 mm. Further, it is preferable that the diffusing material particles 27 be randomly distributed in the transparent member 26. In addition, in order to reduce defocusing, the diffusing plate 24 is preferably made thin. The diffusing plate 24 may be a plate member, such as a glass plate, or a film member Alternatively, as the diffusing plate 24, a ground glass or a filmed having formed thereon a diffusing surface having a diffusion function may be used insofar as it has a light diffusion function.

As shown in FIG. 3, an end of each of the supports 22 is fixed at a middle point obtained by bisecting a longitudinal side (upper side and lower side) of the diffusing plate frame 25, and the other end thereof is fixed to a casing 28 of the optical engine unit 3. The diffusing plate frame 25 is formed of a metal material, such as SUS or the like. As shown in FIG. 4, a peripheral portion of the diffusing plate 24 is fitted into a groove 25a formed at the inside of the diffusing plate frame 25, and then the diffusing plate frame 25 supports the diffusing plate 24 externally. As shown in FIG. 3, the entire light diffusing unit 21 is supported within the casing 28 of the optical engine unit 3 by two supports 22, that is, upper and lower supports 22. The supports 22 are formed of an elastic material, such as rubber or spring. With this configuration, the light diffusing unit 21 is spaced at a predetermined gap from the casing 28 of the optical engine unit 3 and is vibratably supported without coming into contact with the casing 28. Since the light diffusing unit 21 is vibratably provided with the supports 22 as a fulcrum, a position where the supports 22 are connected to the light diffusing unit becomes a vibration node of the light diffusing unit 21. That is, the supports 22 are disposed at positions where the vibration node of the light diffusing unit 21 is disposed. For this reason, the supports 22 do not interfere with the vibration, and the amplitude can be increased.

The vibration generating unit 23 is provided near one corner (in the example of FIG. 3, a lower right corner) of the diffusing plate frame 25 in a gap between the light diffusing unit 21 and the casing 28. As shown in FIG. 4, the vibration generating unit 23 has two piezoelectric elements of a first piezoelectric element 30 and a second piezoelectric element 31 having a first electrode 29 as a common electrode. That is, the piezoelectric elements 30 and 31 of the vibration generating unit 23 are respectively provided in a light incident side and an emergent side of the light diffusing unit 21. In this exemplary embodiment, a portion of the diffusing plate frame 25 extends outward from the vicinity of one corner (a lower right corner) and the extended portion forms the first electrode 29 integrated into the diffusing plate frame 25. Since the diffusing plate frame 25 is formed of the metal material, such as SUS or the like, and has conductivity, the extended portion sufficiently functions as an electrode. Piezoelectric bodies 32 are attached to both sides of the first electrode 29, and second electrodes 33 are provided to respectively cover the piezoelectric bodies 32. The total thickness of the two piezoelectric elements 30 and 31 is substantially equal to the thickness of the diffusing plate frame 25. Further, the longitudinal size of each of the piezoelectric elements 30 and 31 is approximately consistent with the gap between the light diffusing unit 21 and the casing 28. One ends of the piezoelectric elements 30 and 31 are fixed to the diffusing plate frame 25, and the other ends are fixed to the casing 28.

As shown in FIG. 3, the first and second piezoelectric elements 30 and 31 are in rectangular shapes. Long-side directions of the first and second piezoelectric elements 30 and 31 correspond to a long-side direction (an x direction of FIG. 3) of the light diffusing unit 21, and short-side directions of the first and second piezoelectric elements 30 and 31 correspond to a short-side direction (a y direction of FIG. 3) of the light diff-using unit 21. As the specific material of the piezoelectric bodies 32, for example, lead zirconate titanate, crystal, lithium niobate, barium titanate, lead titanate, lead metaniobate, polyvinylidene fluoride, lead zinc niobate, lead scandium niobate, or the like may be exemplified. As the material of the second electrodes 33, an arbitrary metal film, such as silver, aluminum, or the like, may be exemplified.

As shown in FIG. 6, a driving unit 34 that drives the piezoelectric elements 30 and 31 is connected to the second electrodes 33 of the first and second piezoelectric elements 30 and 31 constituting the vibration generating unit 23. The driving unit 34 has a power source (not shown), and supplies a driving signal (driving voltage) to the second electrodes 33 of the first and second piezoelectric elements 30 and 31. An alternating current (AC) signal (AC voltage) is applied to the second electrode 33 of the first piezoelectric element 30 and the second electrode 33 of the second piezoelectric element 31. Meanwhile, the first electrode 29 is common to the first and second piezoelectric elements 30 and 31 and connected to a ground. With this arrangement, the AC signal is supplied from the driving unit 34 such that the potentials of the second electrodes 33 of the first and second piezoelectric elements 30 and 31 are +V and −V, respectively. Then, the piezoelectric elements 30 and 31 expand and contract.

If the piezoelectric elements 30 and 31 expand and contract in response to the AC signal from the driving unit 34, as shown in FIG. 7 in side view, the vibration generating unit 23 generates a vibration to expand and contract in the longitudinal direction of the rectangular shape, that is, in the x direction. The vibration generating unit 23 expands and contracts in the x direction by the vibration of the piezoelectric elements 30 and 31 and displaces an arbitrary point P at the end along the x direction, as shown in FIG. 8 in plan view. In this exemplary embodiment, the light diffusing unit 21 is supported at two middle points of the upper and lower sides, and the vibration generating unit 23 is provided at one cornier of the light diffusing unit 21. Accordingly, even though the point P at the end of the vibration generating unit 23 is displaced in the x direction, the light diffusing unit 21 vibrates in both the x and y directions. That is, if one end of the vibration generating unit 23 reciprocates in one direction with respect to the x direction, the vibration generating unit 23 applies a two-directional coercive vibration to the light diffusing unit 21. In particular, in this exemplary embodiment, since the piezoelectric elements 30 and 31 of the vibration generating unit 23 are provided on both sides of the light diffusing unit 21, a vibration in a z direction that is useless for removing scintillation can be suppressed, and the vibration can be efficiently generated only in the x and y directions.

That is, as shown in FIG. 3, the scintillation removing apparatus 20 of this embodiment reciprocates a portion of the light diffusing unit 21 close to the vibration generating unit 23 in the x and y directions using the application of the coercive vibration by the vibration generating unit 23 and elasticity of the supports 22. Then, since the vibration is applied to a portion close to one corner, it can be seen the vibration is generated such that the entire light diffusing unit 21 vibrates in both the x and y directions by a slight displacement. With this configuration, the scintillation removing apparatus 20 vibrates the light diffusing unit 21 when light transmits the light diffusing unit 21, thereby temporally changing the phase of light. Since the phase of light emitted from the light source unit 9 changes at high speed, in the rear type projector 1 of this embodiment, the occurrence of scintillation can be reduced FIG. 9 shows a frequency characteristic of the entire light diffusing unit 21. In FIG. 9, the horizontal axis represents a vibration frequency [Hz] and the vertical axis represents mechanical impedance [Ω]. The frequency characteristic shows that mechanical impedance has the minimum when the vibration frequency is f0, and the amplitude has the maximum when the light diffusing unit 21 vibrates at that frequency. That is, a unique resonance frequency of the light diffusing unit 21 is f0. In this exemplary embodiment, the light diffusing unit 21 vibrates at the resonance frequency f0 by the piezoelectric elements 30 and 31. Accordingly, even though the piezoelectric element is small and vibration energy to be applied is small, the light diffusing unit 21 can vibrate on a large scale. Therefore, power can be saved and scintillation can be efficiently removed.

Through optimum design of the size of the light diffusing unit 21 or the support 22, it is preferable to adjust the resonance frequency f0 of the light diffusing unit 21 to 20 kHz or more. In general, since it is said that a vibration of 20 kHz or more exceeds the range of hearing of the human, even though the light diffusing unit 21 vibrates in order to remove scintillation in the above-described manner, noise by the vibration is not generated.

For this reason, as shown in FIG. 10, the scintillation removing apparatus 20 of this embodiment has a control signal generating unit 36 (control unit) and a driving unit 34. The control signal generating unit 36 controls the vibration generating unit 23 to vibrate the light diffusing unit 21 at a vibration frequency corresponding to the unique resonance frequency. The control signal generating unit 36 stores the unique resonance frequency of the light diffusing unit 21 in advance, and generates a control signal to vibrate the vibration generating unit 23 at the resonance frequency. The driving unit 34 receives the control signal from the control signal generating unit 36, generates a driving voltage, and supplies the driving voltage to vibrate the vibration generating unit 23. Moreover, the control signal generating unit 36 may be configured to judge a position where scintillation easily occurs or a degree of occurrence from the image signal and to change the phase of light according to the degree of occurrence of scintillation.

However, since a limit of dynamic vision of the human is 1/60 second, if a moment at which the displacement direction of the light diffusing unit 21 is switched exists for 1/60 second or more, scintillation is easily viewed. Accordingly, it is preferable that the scintillation removing apparatus 20 displace the light diffusing unit 21 60 times or more one second by the vibration from the vibration generating unit 23. With this configuration, since the phase of light changes more rapidly than the human recognizes a dynamic body, the occurrence of scintillation can be sufficiently reduced. Since the vibration generating unit 23 of this embodiment uses the piezoelectric elements 30 and 31, high responsibility to an extent that the light diffusing unit 21 is displaced 60 times or more one second can be easily achieved.

Meanwhile, in an electric motor used in the related art, high-speed driving is performed such that the light diffusing unit 21 is displaced 60 times or more one second, but a comparatively large mechanism is needed. As the mechanism becomes large, unnecessary vibration and noise are generated, power consumption increases, and durability is lowered. In addition, it is very difficult to install other optical systems. In contrast, like this embodiment, when the piezoelectric elements 30 and 31 are used, the mechanism of the vibration generating unit 23 can be configured with a small number of parts, and the vibration generating unit 23 can be made small and simplified. Further, in view of little vibration or noise and low power consumption, an excellent scintillation removing apparatus can be implemented. Therefore, since the vibration generating unit 23 can be made small, the vibration generating unit 23 can be housed in a narrow space between the light diffusing unit 21 and the casing 28. In addition, the length of an optical axis direction can be made equal to the thickness of the light diffusing unit 21, which contribute to the reduction of the size of the apparatus.

Second Exemplary Embodiment

Hereinafter, a second exemplary embodiment will be described with reference to FIG. 11.

In the second exemplary embodiment, a scintillation removing apparatus is also incorporated into an optical engine unit of a rear type projector. The basic configuration of the entire rear type projector is the same as the first exemplary embodiment. A difference from the first exemplary embodiment is the configuration of the scintillation removing apparatus, and thus a description will be given for only that portion.

Figure 11:
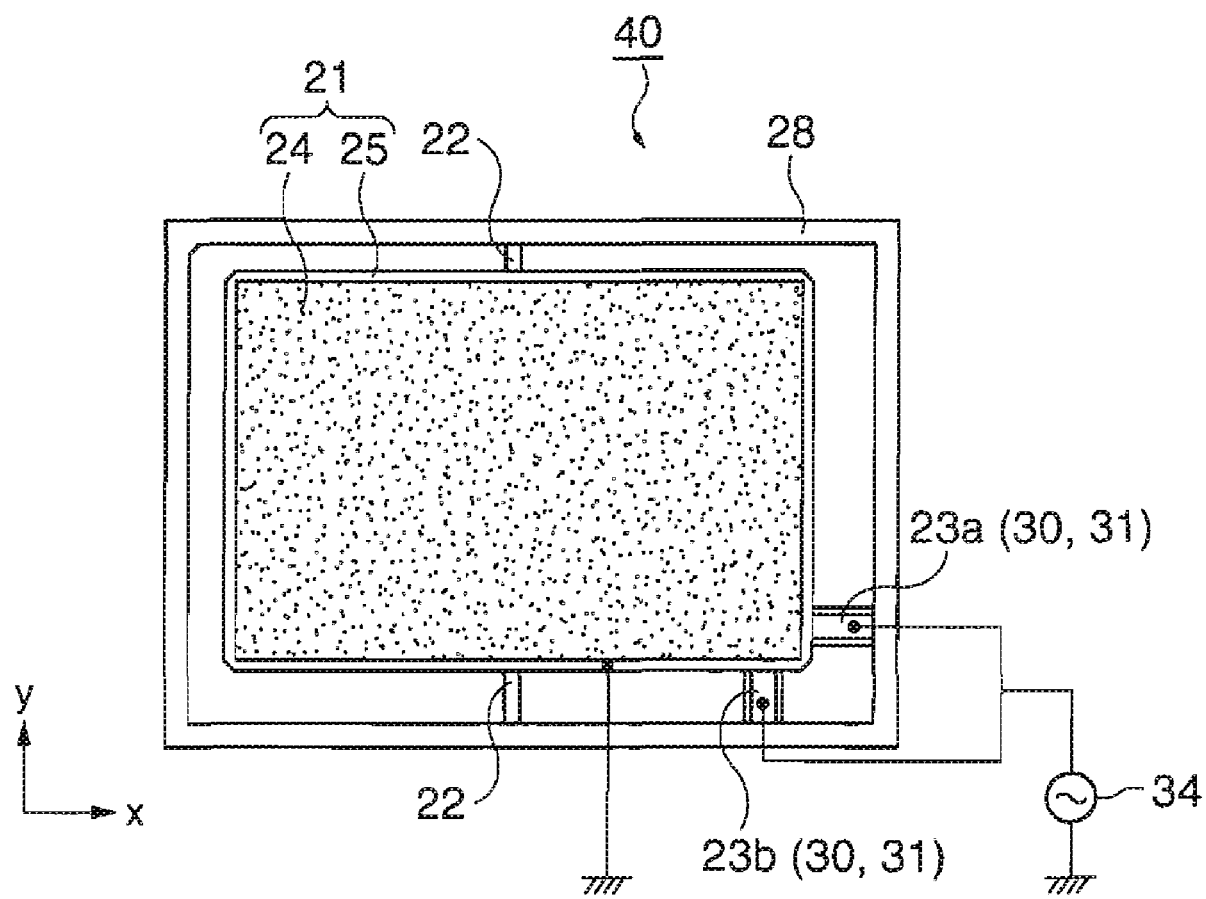
FIG. 11 is a plan view showing a scintillation removing apparatus according to a second exemplary embodiment.

FIG. 11 corresponds to FIG. 3 of the first exemplary embodiment and is a plan view showing a scintillation removing apparatus in an optical engine unit. In FIG. 11, the same parts as those in FIG. 3 are represented by the same reference numerals, and the detailed descriptions thereof will be omitted. Moreover, in FIG. 11, wiring lines to individual electrodes of piezoelectric elements 30 and 31 are omitted, but they are as shown in FIG. 6.

As shown in FIG. 11, like the first exemplary embodiment, a scintillation removing apparatus 40 of this embodiment has a light diffusing unit 21, supports 22, and a vibration generating unit 23, and the light diffusing unit 21 has a diffusing plate 24 and a diffusing plate frame 25. Further, the supports 22 are provided at middle points of upper and lower sides of the diffusing plate frame 25, and the light diffusing unit 21 is supported in a casing 28 by the two supports 22, that is, the upper and lower supports 22. Meanwhile, while one vibration generating unit 23 is provided near one corner of the light diffusing unit 21 in the first exemplary embodiment, in this exemplary embodiment, two vibration generating units 23a and 23b are provided near one corner of the light diffusing unit 21. Moreover, in this specification, since the piezoelectric elements are provided on both the incident side and the emergent side of the light diffusing unit 21, two piezoelectric elements are included in one vibration generating unit, but they are regarded as one vibration generating unit.

The two vibration generating units 23a and 23b are provided near one corner (in the example of FIG. 11, a lower right corner) of the light diffusing unit 21. The first vibration generating unit 23a is provided below a right side of the rectangular light diffusing unit 21. The piezoelectric elements 30 and 31 are fixed such that the longitudinal directions thereof are directed to the longitudinal direction (the x direction) of the light diffusing unit 21. The second vibration generating unit 23b is provided on a right side of a lower side of the light diffusing unit 21. The piezoelectric elements 30 and 31 are fixed such that the longitudinal directions thereof are directed to the transverse direction (the y direction) of the light diffusing unit 21. Accordingly, the vibration directions of the first vibration generating unit 23a and the second vibration generating unit 23b are perpendicular to each other. Like the first exemplary embodiment, the piezoelectric elements 30 and 31 are provided on both sides of the light diffusing unit 21. A driving unit 34 that commonly drives four piezoelectric elements 30 and 31 of the two vibration generating units 23a and 23b in total is connected to first and second electrodes 29 and 33 of the individual piezoelectric elements 30 and 31 facing each other with a piezoelectric body 32 interposed therebetween.

In this exemplary embodiment, like the first exemplary embodiment, a rear type projector that can effectively remove scintillation and has excellent practicality in view of vibration or noise, power consumption, and the like can be implemented. In particular, in this exemplary embodiment, the two vibration generating units 23a and 23b are provided, and thus a large vibration can be applied to the light diffusing unit 21.

In the first exemplary embodiment, the vibration generating unit 23 is provided such that the longitudinal directions of the piezoelectric elements 30 and 31 are directed to the x direction, and the light diffusing unit 21 vibrates in both the x and y directions only by the expansion and contraction of the vibration generating unit 23 in the x direction. In contrast, in this exemplary embodiment, near one corner of the light diffusing unit 21, the vibration generating unit 23a is provided such that the longitudinal directions of the piezoelectric elements 30 and 31 are directed to the x direction, and the vibration generating unit 23b is provided such that the longitudinal directions of the piezoelectric elements 30 and 31 are directed to the y direction. Further, the light diffusing unit 21 vibrates in both the x and y directions by the expansion and contraction of the vibration generating unit 23a in the x direction and the expansion and contraction of the vibration generating unit 23b in the y direction. For this reason, the vibration direction or the amplitude can be freely adjusted by changing the driving voltage and the size of the piezoelectric element (in particular, the size in the longitudinal direction) or the number of piezoelectric elements. Accordingly, a degree of reduction in scintillation (that is, sharpness of an image) can be controlled by adjusting the vibration direction or the amplitude. In such a manner, a scintillation removing apparatus that can increase a degree of freedom for the adjustment, and effectively remove scintillation can be implemented.

Third Exemplary Embodiment

Hereinafter, a third exemplary embodiment will be described with reference to FIGS. 12 and 13.

In this exemplary embodiment, a scintillation removing apparatus is also incorporated into an optical engine unit of a rear type projector. The basic configuration of the entire rear type projector is the same as the first or second exemplary embodiments. A difference from the first or second exemplary embodiments is the configuration of the scintillation removing apparatus, and thus a description will be given for only that portion.

Figure 12:
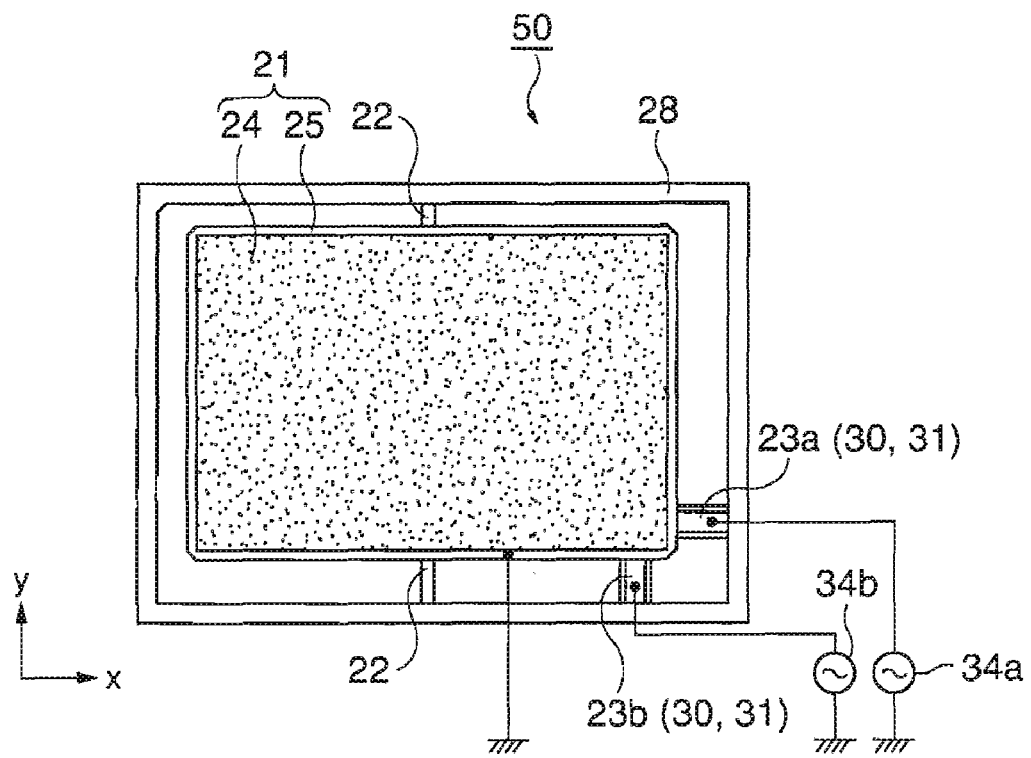
FIG. 12 is a plan view showing a scintillation removing apparatus according to a third exemplary embodiment.

FIG. 12 corresponds to FIG. 3 of the first exemplary embodiment or FIG. 11 of the second exemplary embodiment and is a plan view showing a scintillation removing apparatus in an optical engine unit. In FIG. 12, the same parts as those in FIG. 3 or 11 are represented by the same reference numerals, and the detailed descriptions thereof will be omitted. Moreover, in FIG. 12, wiring lines to individual electrodes of piezoelectric elements 30 and 31 are omitted, but they are as shown in FIG. 6.

As shown in FIG. 12, like the second exemplary embodiment, in a scintillation removing apparatus 50 of this embodiment, two vibration generating units 23a and 23b are provided near one corner (in the example of FIG. 12, a lower right corner) of a light diffusing unit 21. The first vibration generating unit 23a is provided below a right side of the light diffusing unit 21, and the piezoelectric elements 30 and 31 are fixed such that the longitudinal directions thereof are directed to the longitudinal direction (the x direction) of the light diffusing unit 21. The second vibration generating unit 23b is provided on a right side of a lower side of the light diffusing unit 21, and the piezoelectric elements 30 and 31 are fixed such that the longitudinal directions thereof are directed to the transverse direction (the y direction) of the light diffusing unit 21. Accordingly, the vibration directions of the first vibration generating unit 23a and the second vibration generating unit 23b are perpendicular to each other. Further, the piezoelectric elements 30 and 31 are provided on both sides of the light diffusing unit 21.

In the second exemplary embodiment, a driving unit 34 that commonly drives four piezoelectric elements 30 and 31 of the two vibration generating units 23a and 23b is connected to first and second electrodes 29 and 33 of the individual piezoelectric elements 30 and 31. In contrast, in this exemplary embodiment, a first driving unit 34a and a second driving unit 34b that separately drive the piezoelectric elements 30 and 31 are respectively connected to the first vibration generating unit 23a and the second vibration generating unit 23b. Accordingly, while a set of the vibration generating unit and the driving unit is shown in FIG. 6 of the first exemplary embodiment, in this exemplary embodiment, two sets are provided.

Figure 13:
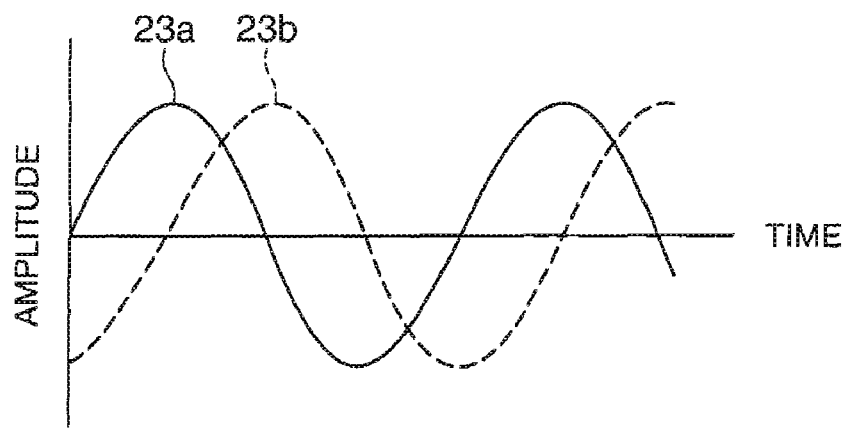
FIG. 13 is a diagram showing waveforms of an alternating current (AC) signal to be supplied to individual vibration generating units of an apparatus according to the third exemplary embodiment.

FIG. 13 is a diagram showing the waveforms of AC signals to be supplied from the individual driving units 34a and 34b to the piezoelectric elements 30 and 31 of the individual vibration generating units 23a and 23b. In FIG. 13, the horizontal axis represents time (a unit is arbitrarily set) and the vertical axis represents an amplitude (a unit is arbitrarily set). The waveform of the AC signal to be supplied to the piezoelectric elements 30 and 31 of the first vibration generating unit 23a is represented by a solid line, and the waveform of the AC signal to be supplied to the piezoelectric elements 30 and 31 of the second vibration generating unit 23b is represented by a broken line. As shown in FIG. 13, the AC signals having waveforms out of phase are respectively input to the piezoelectric elements 30 and 31 of the two vibration generating units 23a and 23b. Timings of the AC signals can be controlled by the control signal generating unit 36 shown in FIG. 10.

In this exemplary embodiment, like the first exemplary embodiment, a rear type projector that can effectively remove scintillation and has excellent practicality in view of vibration or noise, power consumption, and the like can be implemented. Further, since the two vibration generating units 23a and 23b are disposed, and thus a large vibration can be applied to the light diffusing unit 21. In addition, like the second exemplary embodiment, a degree of freedom for the adjustment can be increased, and scintillation can be effectively removed.

In this exemplary embodiment, as shown in FIG. 13, the driving signals to be supplied to the piezoelectric elements 30 and 31 of the two vibration generating units 23a and 23b, in which the vibration directions are perpendicular to each other, are out of phase. Accordingly, the light diffusing unit 21 performs a circular motion (an orbit may be a round or an ellipse) within an xy plane. Unlike a linear reciprocation, in case of the circular motion, since a period in which the motion of the light diffusing unit 21 stops is eliminated, scintillation is rarely viewed.

Fourth Exemplary Embodiment

Hereinafter, a fourth exemplary embodiment will be described with reference to FIGS. 14 and 15.

In this exemplary embodiment, the basic configuration of the entire rear type projector is the same as the first exemplary embodiment. A difference from the first to third exemplary embodiments is only the configuration of a scintillation removing apparatus, and a description will be given for only that portion.

Figure 14:
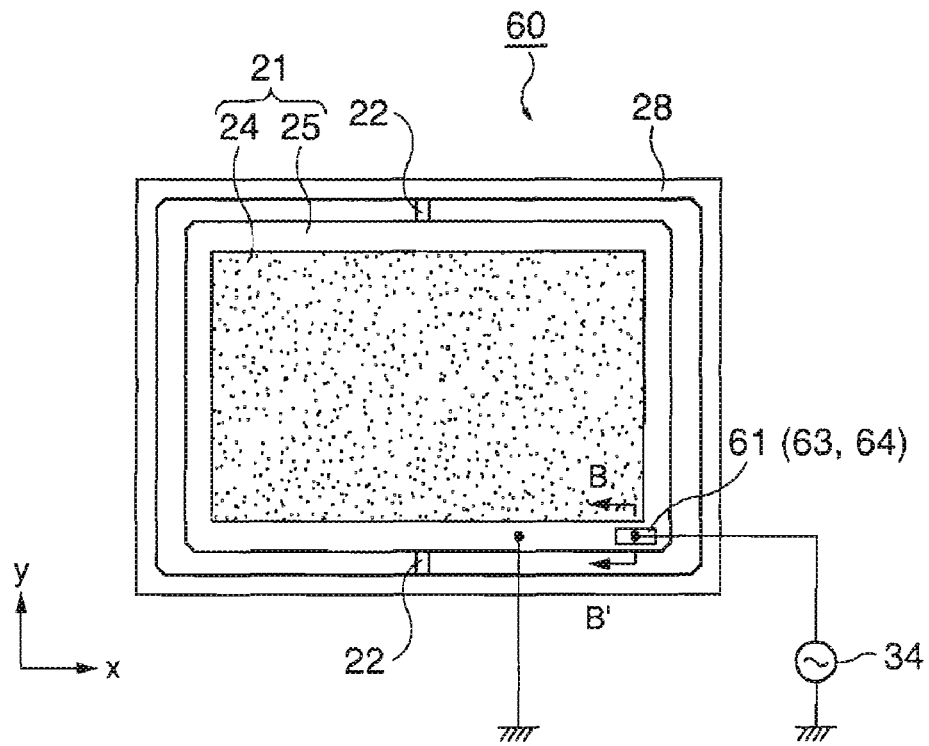
FIG. 14 is a plan view showing a scintillation removing apparatus according to a fourth exemplary embodiment.
Figure 15:
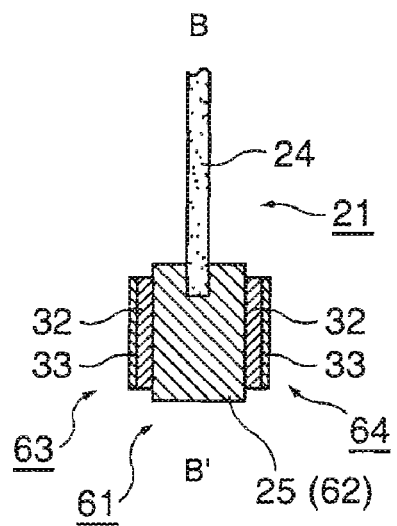
FIG. 15 is a cross-sectional view taken along the line B-B' of FIG. 14.

FIG. 14 corresponds to FIG. 3 of the first exemplary embodiment and is a plan view showing a scintillation removing apparatus in an optical engine unit. FIG. 15 corresponds to FIG. 4 of the first exemplary embodiment and is a cross-sectional view taken along the line B-B' in FIG. 14. In FIGS. 14 and 15, the same parts as those in FIGS. 3 and 4 are represented by the same reference numerals, and the detailed descriptions thereof will be omitted. Moreover, in FIG. 14, wiring lines to individual electrodes of piezoelectric elements 63 and 64 are omitted, but they are as shown in FIG. 6.

Like the first exemplary embodiment, as shown in FIG. 14, a scintillation removing apparatus 60 of this embodiment has a light diffusing unit 21, supports 22, and a vibration generating unit, and the light diffusing unit 21 has a diffusing plate 24 and a diffusing plate frame 25. Further, the supports 22 are provided at middle points of upper and lower sides of the diffusing plate frame 25, and the light diffusing unit 21 is supported in a casing 28 by the two supports 22, that is, upper and lower supports 22. Meanwhile, while the vibration generating unit 23 is provided in the gap between the light diffusing unit 21 and the casing 28 of the optical engine unit 3 in the first exemplary embodiment, in this exemplary embodiment, a vibration generating unit 61 is provided directly on the light diffusing unit 21.

In this exemplary embodiment, the vibration generating unit 61 is provided near one corner (in the example of FIG. 14, a lower right corner) of the diffusing plate frame 25. As shown in FIG. 15, the vibration generating unit 61 has two piezoelectric elements of first and second piezoelectric elements 63 and 64 having a first electrode 62 as a common electrode. That is, the piezoelectric elements 63 and 64 of the vibration generating unit 61 are respectively provided on a light incident side and a light emergent side of the light diffusing unit 21. In this exemplary embodiment, a portion of the diffusing plate frame 25 formed of a metal material, such as SUS or the like, functions as the first electrode 62 as it is. Piezoelectric bodies 32 are attached at corresponding positions of both sides of the diffusing plate frame 25, and second electrodes 33 are provided to respectively cover the outer surfaces of the piezoelectric bodies 32. Accordingly, in this exemplary embodiment, a fixed end of the vibration generating unit 61 is not provided outside the light diffusing unit 21, and it is not necessary to fix the vibration generating unit 61 to the casing 28 of the optical engine unit 3, unlike the above-described embodiments. Materials of the piezoelectric bodies 32 or the electrodes 62 and 33, and a method of driving the individual piezoelectric elements 63 and 64 are the same as the above embodiments. Further, the piezoelectric elements 63 and 64 are configured to vibrate the light diffusing unit 21 at the unique resonance frequency.

In this exemplary embodiment, like the first exemplary embodiment, a rear type projector that can effectively remove scintillation and has excellent practicality in view of vibration or noise, power consumption, and the like can be implemented. Further, in this exemplary embodiment, the vibration generating unit 61 is provided directly on both sides of the diffusing plate frame 25 of the light diffusing unit 21, and the light diffusing unit 21 itself vibrates by the vibrations of the piezoelectric elements 63 and 64. That is, the light diffusing unit 21 is not coercively vibrated from the outside of the light diffusing unit 21. Accordingly, only the supports 22 of the light diffusing unit 21 with respect to the casing 28 of the optical engine unit 3 is needed, and the support of the vibration generating unit 61 is not needed. For this reason, a space for forming the piezoelectric elements 63 and 64 is needed in the diffusing plate frame 25 of the light diffusing unit 21, but the sizes of the piezoelectric elements 63 and 64 do not impose a limit to design for the gap between the light diffusing unit 21 and the casing 28.

Fifth Exemplary Embodiment

Figure 17:
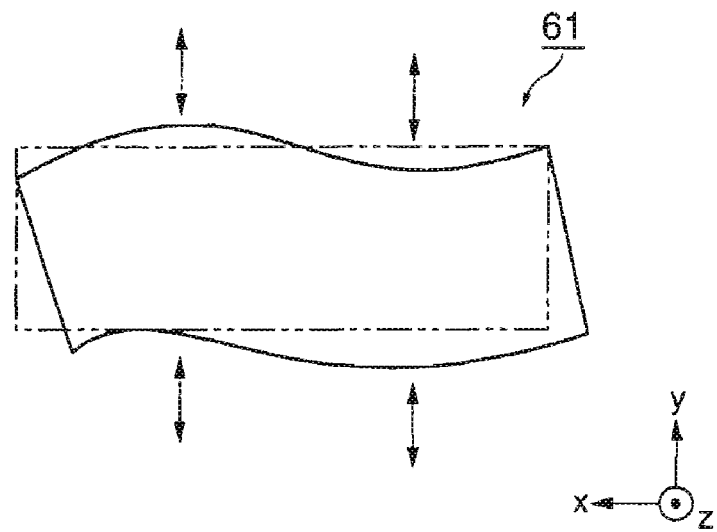
FIG. 17 is a diagram illustrating a bending vibration of a vibration generating unit according to the fifth exemplary embodiment.
Figure 18:
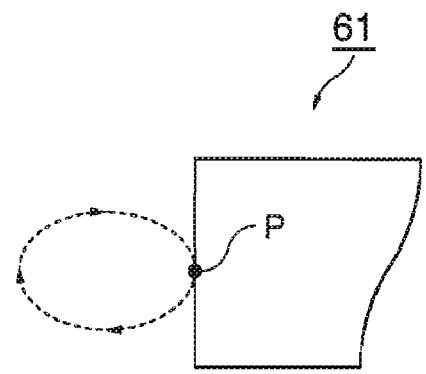
FIG. 18 is a diagram illustrating a displacement of a vibration generating unit upon the bending vibration according to the fifth exemplary embodiment.

Hereinafter, a fifth exemplary embodiment will be described with reference to FIGS. 16 to 18.

In this exemplary embodiment, the basic configuration of the entire rear type projector is the same as the first exemplary embodiment. Further, the configuration of the scintillation removing apparatus is completely the same as the fourth exemplary embodiment. The only difference is that a light diffusing unit has two resonance frequencies of different vibration modes. This will now be described.

Figure 16:
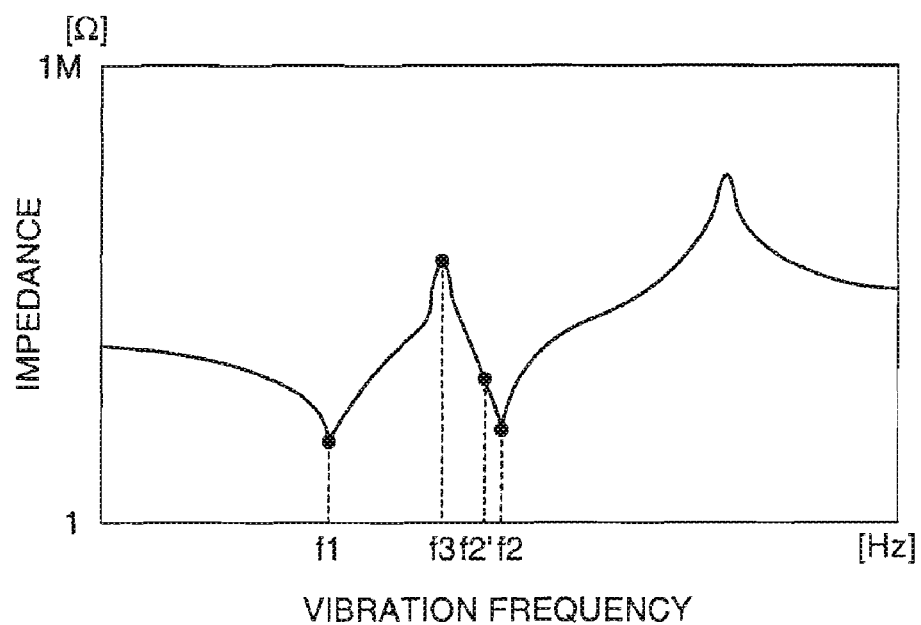
FIG. 16 is a diagram showing the relationship between a vibration frequency of a light diffusing unit and impedance according to a fifth exemplary embodiment.

FIG. 16 corresponds to FIG. 9 of the first exemplary embodiment and is a diagram showing the relationship between a vibration frequency of a light diffusing unit and impedance. FIG. 17 is a diagram illustrating a bending vibration of a vibration generating unit. FIG. 18 is a diagram illustrating a displacement of the vibration generating unit upon the bending vibration. In FIGS. 16 to 18, the same parts as in the above drawings are represented by the same reference numerals, and the detailed descriptions thereof will be omitted, In the scintillation removing apparatus 60 of the fourth exemplary embodiment shown in FIG. 14, through optimum design of the size or material of the light diffusing unit 21, the relationship between the vibration frequency of the light diffusing unit 21 and impedance can show a characteristic having two resonance frequencies, as shown in FIG. 16. Moreover, in FIG. 16, f1 denotes a resonance frequency of an in-plane vertical vibration mode (a resonance frequency in an x or y direction), and f2 denotes a resonance frequency of an in-plane bending vibration mode (secondary). Further, in the scintillation removing apparatus 60 shown in FIG. 14, since the vibration generating unit 61 is provided directly on the diffusing plate frame 25, in the following description, the vibration of the vibration generating unit 61 can be regarded as the vibration of the light diffusing unit 21.

As shown in FIG. 7, if the vibration generating unit 23 expands and contracts in the x direction, according to design of the light diffusing unit 21, the weight of the light diffusing unit 21 may be out of balance, and a rotation moment may occur in the vibration generating unit 23 around the center of gravity of the vibration generating unit 23. Then, in the vibration generating unit 61, the expansion and contraction in the x direction occurs, as shown in FIG. 7, and a bending motion that pivots in the y direction occurs due to the rotation moment, as shown in FIG. 17. If the vibration by the expansion and contraction in the x direction shown in FIG. 7 is called a vertical vibration, and the vibration by the bending motion shown in FIG. 17 is called a bending vibration, through the combination of the vertical vibration and the bending vibration, as shown in FIG. 18, an arbitrary point P of the vibration generating unit 61 (the light diffusing unit 21) is displaced to follow an approximately elliptic orbit.

Here, it is assumed that the resonance frequency f1 of the vertical vibration mode and the resonance frequency f2 of the bending vibration mode (secondary) shown in FIG. 16 are very close to each other, for example, f1 is 40 kHz and f2 is 41 kHz, and a difference between the two resonance frequencies is less than 10%. In general, the dominance of any one of the vertical vibration mode and the bending vibration mode of the vibration generating unit depends on the frequency of the driving signal supplied to the piezoelectric elements. However, as described above, if the values of the two resonance frequencies are close to each other, and the frequency of the driving signal is set to a value (for example, a frequency f2') between f1 and f2, the vertical vibration and the bending vibration occur simultaneously. Accordingly, since the light diffusing unit 21 continuously performs an elliptic motion within the xy plane, scintillation is rarely viewed. Therefore, according to this embodiment, scintillation can be effectively removed by a simple configuration in which one vibration generating unit 61 (two of both sides) and one driving unit 34 (power source) are provided. Moreover, if the difference between the two resonance frequencies exceeds 10%, even though the vibration generating unit is driven at a frequency between the resonance frequencies, the vertical vibration and the bending vibration do not occur simultaneously. As a result, the difference between the two resonance frequencies is preferably less than 10%.

Sixth Exemplary Embodiment

Hereinafter, a sixth exemplary embodiment will be described with reference to FIGS. 19 to 21.

In this exemplary embodiment, the basic configuration of the entire rear type projector is the same as the first exemplary embodiment. Further, the configuration of the scintillation removing apparatus is substantially the same as the fourth exemplary embodiment, and a vibration generating unit is provided directly on a light diffusing unit. An only difference is that, while the vibration generating unit is provided at one place in the fourth exemplary embodiment, in this exemplary embodiment, vibration generating units are provided at multiple places.

Figure 19:
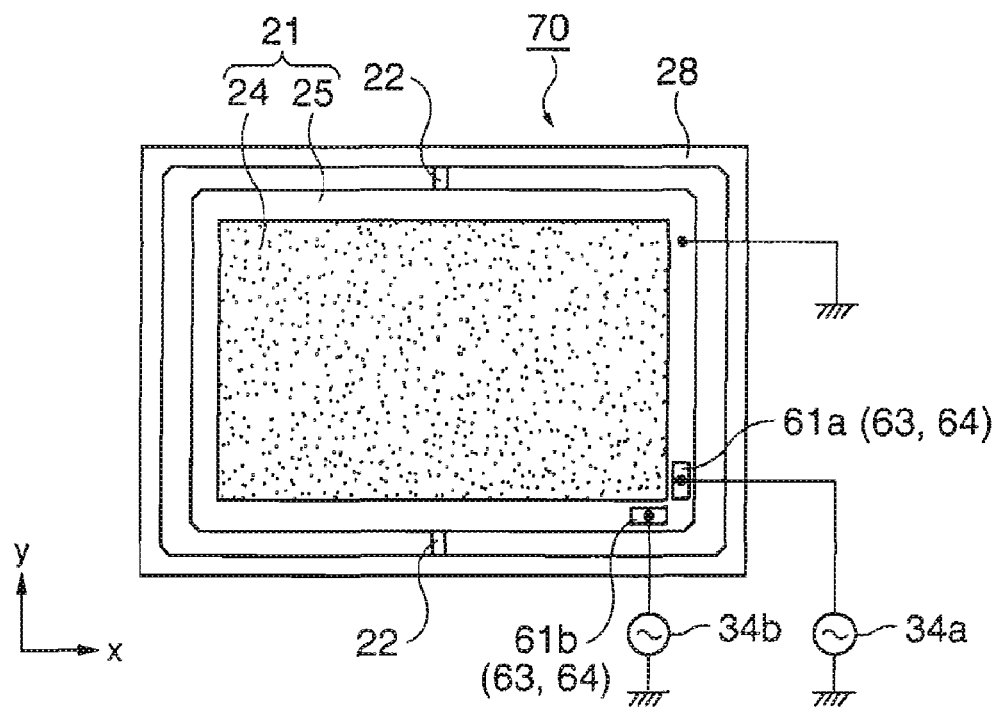
FIG. 19 is a plan view showing a scintillation removing apparatus according to a sixth exemplary embodiment.

FIG. 19 corresponds to FIG. 3 of the first exemplary embodiment and is a plan view showing a scintillation removing apparatus in an optical engine unit. FIGS. 20 and 21 are respectively plan views showing modifications of the scintillation removing apparatus. In FIGS. 19 to 21, the same parts as those in FIG. 3 are represented by the same reference numerals, and the detailed descriptions thereof will be omitted. Moreover, in FIGS. 19 to 21, wiring lines to individual electrodes of piezoelectric elements 63 and 64 are omitted, but they are as shown in FIG. 6.

Like the fourth and fifth exemplary embodiments, as shown in FIG. 19, in a scintillation removing apparatus 70 of this embodiment, vibration generating units 61a and 61b are provided directly on a diffusing plate frame 25 of a light diffusing unit 21. However, in this exemplary embodiment, the vibration generating units 61a and 61b are provided at two places near one corner (in the example of FIG. 19, a lower right corner) of the diffusing plate frame 25. Further, each of the vibration generating units 61a and 61b has the diffusing plate frame 25 as a common electrode, and two piezoelectric elements 63 and 64 respectively provided in a light incident side and a light emergent side of the light diffusing unit 21. The two vibration generating units 61a and 61b are disposed such that the vibration directions thereof are perpendicular to each other within the xy plane. The materials of the piezoelectric bodies or the electrodes and the method of driving the individual piezoelectric elements 63 and 64 are the same as the above-described embodiments, and the piezoelectric elements 63 and 64 are configured to vibrate the light diffusing unit 21 at the unique resonance frequency. Further, driving units 34a and 34b that can separately supply the driving signals are respectively connected to the two vibration generating units 61a and 61b.

In this exemplary embodiment, like the first exemplary embodiment, a rear type projector that can effectively remove scintillation and has excellent practicality in view of vibration or noise, power consumption, and the like can be implemented. In particular, in this exemplary embodiment, since the vibration generating units 61a and 61b are disposed at two places, a larger vibration can be applied to the light diffusing unit 21. Further, since the vibration generating units 61a and 61b at two places are separately driven by the driving units 34a and 34b, a circular motion is generated by causing the driving signals to be supplied to the vibration generating units 61a and 61b at two places to be out of phase. Therefore, scintillation is rarely viewed.

Figure 20:
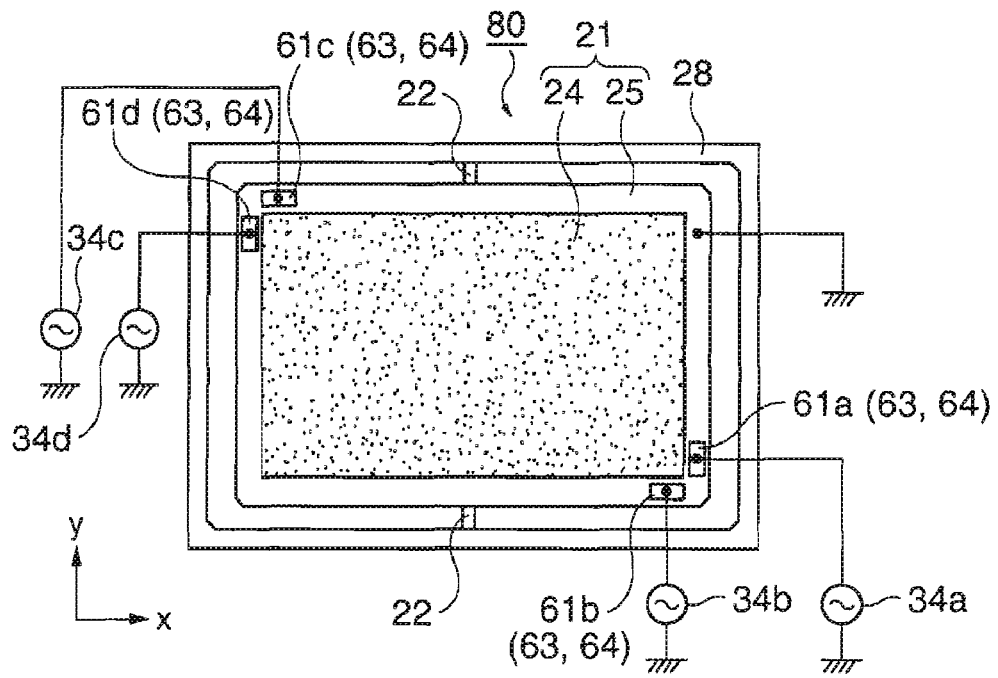
FIG. 20 is a plan view showing a modification of an apparatus according to the sixth exemplary embodiment.

Further, as shown in FIG. 20, the number of the vibration generating units may be increased. For example, vibration generating units 61a, 61b, 61c, and 61d may be provided at two places near each of two corners (in the example of FIG. 20, lower right and upper left corners), that is, at four places in total, on a diagonal of the diffusing plate frame 25. In this example, driving units 34a, 34b, 34c, and 34d are respectively connected to the four vibration generating units 61a, 61b, 61c, and 61d. Accordingly, the vibrations by the four vibration generating units 61a, 61b, 61c, and 61d can be suitably set to be out of phase. Therefore, a larger vibration can be obtained, and a circular motion can be generated.

Figure 21:
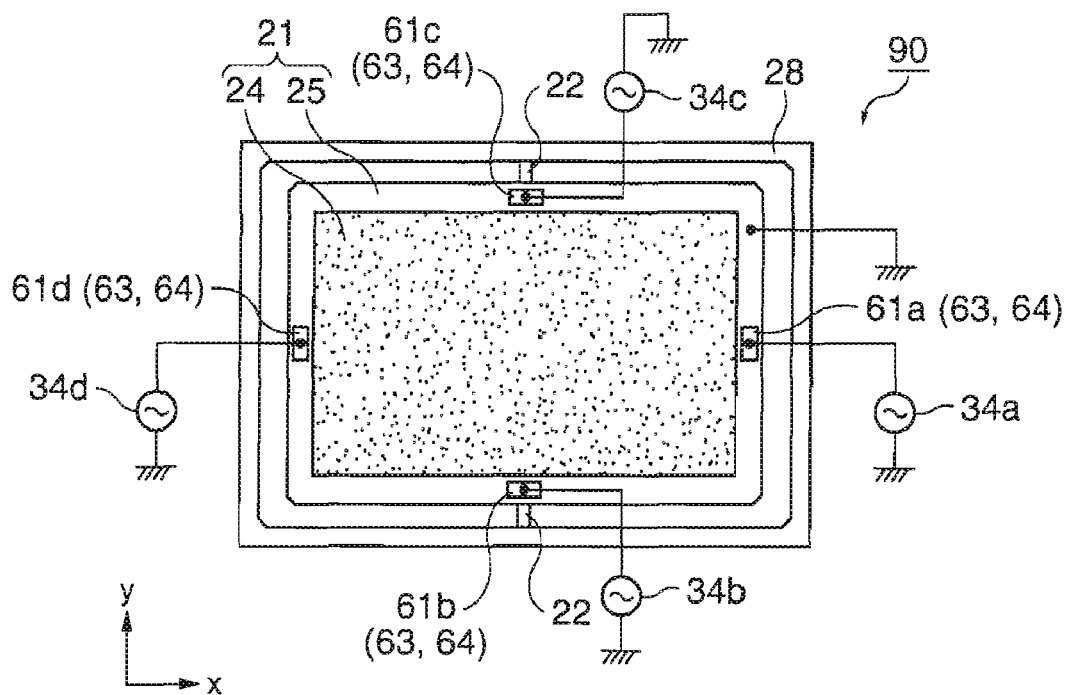
FIG. 21 is a plan view showing another modification of an apparatus according to the sixth exemplary embodiment.

Alternatively, when vibration generating units are provided at four places of the light diffusing unit, as shown in FIG. 21, vibration generating units 61a, 61b, 61c, and 61d may be disposed at middle points of individual sides (upper and lower sides) in the longitudinal direction of the diffusing plate frame 25 of the light diffusing unit 21 and at middle points of individual sides (left and right sides) in the transverse direction thereof. When this arrangement is adopted, the vibration generating units 61b and 61c disposed along the long sides of the diffusing plate frame 25 are particularly disposed near the supports 22 of the light diffusing unit 21. In this example, driving units 34a, 34b, 34c, and 34d are respectively connected to the vibration generating units 61a, 61b, 61c, and 61d at four places. When this configuration is adopted, the driving signals can be separately supplied to the vibration generating units 61a, 61b, 61c, and 61d at four places. Therefore, a degree of freedom for the adjustment of the vibration mode can be further improved.

Seventh Exemplary Embodiment

Hereinafter, a seventh exemplary embodiment will be described with reference to FIGS. 22 and 23.

In this exemplary embodiment, the basic configuration of the entire rear type projector is the same as the first exemplary embodiment. Further, the configuration of the scintillation removing apparatus is different from the above embodiments in that the support structure of the light diffusing unit is such that the light diffusing unit is supported to be separately vibratable in two directions.

Figure 22:
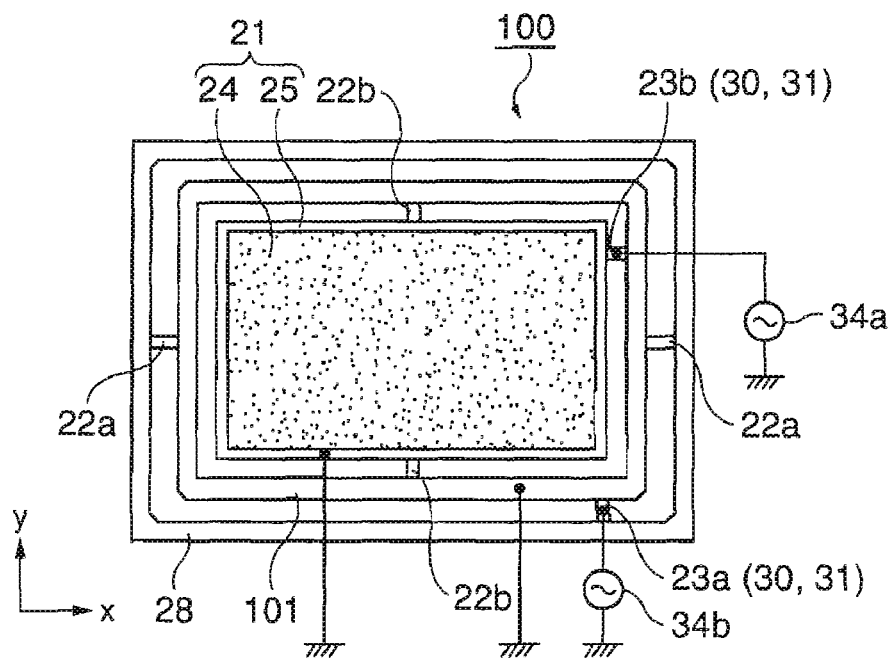
FIG. 22 is a plan view showing a scintillation removing apparatus according to a seventh exemplary embodiment.
Figure 23:
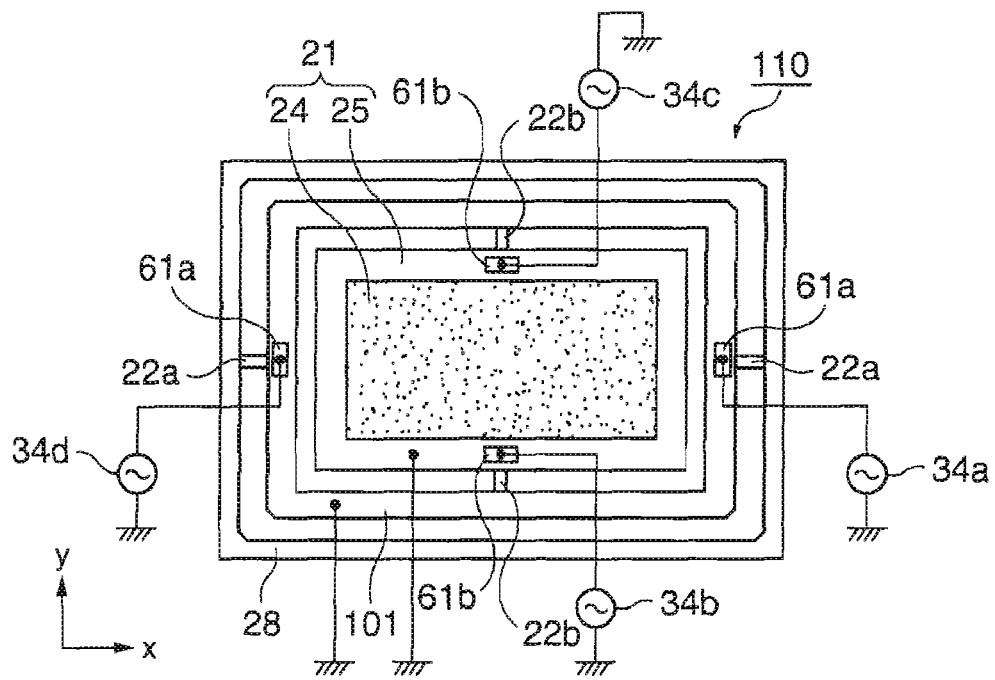
FIG. 23 is a plan view showing a modification of an apparatus according to the seventh exemplary embodiment.

FIG. 22 corresponds to FIG. 3 of the first exemplary embodiment and is a plan view showing a scintillation removing apparatus in an optical engine unit. Further, FIG. 23 is a plan view showing a modification of the scintillation removing apparatus. In FIGS. 22 and 23, the same parts as those in FIG. 3 are represented by the same reference numerals, and the detailed descriptions thereof will be omitted. Moreover, in FIGS. 22 and 23, wiring lines to individual electrodes of piezoelectric elements 30 and 31 are omitted, but they are as shown in FIG. 6.

As shown in FIG. 22, in a scintillation removing apparatus 100 of this embodiment, a light diffusing unit 21 is not supported directly in a casing 28 of an optical engine unit 3 through supports, and a support frame 101 (frame) is interposed between the light diffusing unit 21 (light diffusing unit main body) and the casing 28. That is, a rectangular support frame 101 that is larger than an outer diameter of the light diffusing unit 21 and is smaller than an inner diameter of the casing 28 of the optical engine unit 3 is disposed inside the casing 28. The support frame 101 is connected to the casing 28 by supports 22a provided at middle points of two sides (in FIG. 22, right and left sides) in the transverse direction of the support frame 101. Further, the light diffusing unit 21 is disposed inside the support frame 101 and is connected to the support frame 101 by supports 22b provided at middle points of two sides (in FIG. 22, upper and lower sides) in the longitudinal direction of the light diffusing unit 21.

Further, a first vibration generating unit 23a is provided near one corner (in the example of FIG. 22, a lower right corner) of the supper frame 101 in a gap between the support frame 101 and the casing 28. The piezoelectric elements 30 and 31 of the first vibration generating unit 23a are disposed such that the longitudinal directions thereof are directed in a short-side direction of the support frame 101 (a y direction of FIG. 22). Further, a second vibration generating unit 23b is provided near one corner (in the example of FIG. 22, an upper right corner) of the light diffusing unit 21 in a gap between the light diffusing unit 21 and the support frame 101. The piezoelectric elements 30 and 31 of the second vibration generating unit 23b are disposed such that the longitudinal directions thereof are directed in a long-side direction of the light diffusing unit 21 (an x direction of FIG. 22). With this configuration, by the vibration to be applied from the first vibration generating unit 23a, the light diffusing unit 21 and the support frame 101 vibrate in the short-side direction of the light diffusing unit 21 (the y direction of FIG. 22) with respect to the casing 28 with the supports 22a as a fulcrum. Further, by the vibration to be applied from the second vibration generating unit 23b, the light diffusing unit 11 vibrates in the long-side direction of the light diffusing unit 21 (the x direction of FIG. 22) with the supports 22b as a fulcrum. Accordingly, when the vibrations are applied simultaneously from the first vibration generating unit 23a and the second vibration generating unit 23b, the vibration in the x direction and the vibration in the y direction are synthesized, the light diffusing unit 21 performs a circular motion with respect to the casing 28.

In this exemplary embodiment, driving units 34a and 34b are separately connected to the first vibration generating unit 23a and the second vibration generating unit 23b. Accordingly, driving signals can be separately supplied to the first vibration generating unit 23a and the second vibration generating unit 23b. Further, in this exemplary embodiment, as shown in FIG. 13 of the third exemplary embodiment, it is also assumed that the driving signals out of phase are supplied to the individual piezoelectric elements 30 and 31 of the first vibration generating unit 23a and the second vibration generating unit 23b. In addition, the waveforms of the individual driving signals are set such that, when an excitation frequency of each of the piezoelectric elements 30 and 31 of the first vibration generating unit 23a is f1 and an excitation frequency of each of the piezoelectric elements 30 and 31 of the second vibration generating unit 23b is f2, the relationship f1=n×f2 (where n is a natural number of 1 or more). Here, the excitation frequency f1 of each of the piezoelectric elements 30 and 31 of the first vibration generating unit 23a is a resonance frequency as a vibrator including the light diffusing unit 21 and the support frame 101. The excitation frequency f2 of each of the piezoelectric elements 30 and 31 of the second vibration generating unit 23b is a resonance frequency as the light diffusing unit 21.

In this exemplary embodiment, like the first exemplary embodiment, a rear type projector that can effectively remove scintillation and has excellent practicality in view of vibration or noise, power consumption, and the like can be implemented. Further, according to the scintillation removing apparatus 100 of this embodiment, the light diffusing unit 21 is supported at the middle points of the individual sides in the x and y directions of the light diffusing unit 21 where the vibration node is disposed. Accordingly, the supports 22a and 22b do not interfere with the vibration, and the amplitude of the vibration in each of the x and y directions can be maximized. Therefore, a large vibration can be obtained.

Further, since the waveforms of the driving signals to be supplied to the vibration generating units 23a and 23b at two places are out of phase, the light diffusing unit 21 performs the continuous circular motion within the xy plane. Unlike a linear reciprocation, in case of the circular motion, since a period in which the motion of the light diffusing unit 21 stops is eliminated, scintillation is rarely viewed. Here, from the vibration generating units 23a and 23b at two places, the excitation frequency f1 of each of the piezoelectric elements 30 and 31 of the first vibration generating unit 23a is set to be n times as large as the excitation frequency f2 of each of the piezoelectric elements 30 and 31 of the second vibration generating unit 23b. Accordingly, the shifted phases are not arranged gradually, and the shifted phases of the two driving signals are constantly kept. For this reason, the circular motion is continuously performed without stopping, and a period in which scintillation is viewed is eliminated.

Further, when the support structure of the light diffusing unit 21 is a dual structure shown in FIG. 22, the coercive vibration is not performed from the outside of the light diffusing unit 21 or the support frame 101 by the vibration generating unit. For example, as shown in FIG. 23, vibration generating units 61a and 61b may be provided directly on the light diffusing unit 21 or the support frame 101. In this example, the first vibration generating units 61a are provided at middle points of the individual sides (left and right sides) in the transverse direction of the support frame 101 and the second vibration generating units 61b are provided at middle points of the individual sides (upper and lower sides) in the longitudinal direction of the light diffusing unit 21. When this arrangement is adopted, a scintillation removing apparatus that can effectively remove scintillation can also be implemented.

Eighth Exemplary Embodiment

Hereinafter, an eighth exemplary embodiment will be described with reference to FIGS. 24 and 25.

In this exemplary embodiment, the basic configuration of the entire rear type projector is the same as the first exemplary embodiment. However, while an example where the scintillation removing apparatus is disposed in the optical engine unit has been described in the first to seventh exemplary embodiments, in this exemplary embodiment, an example where a scintillation removing apparatus is disposed in a projection lens will be described.

Figure 24:
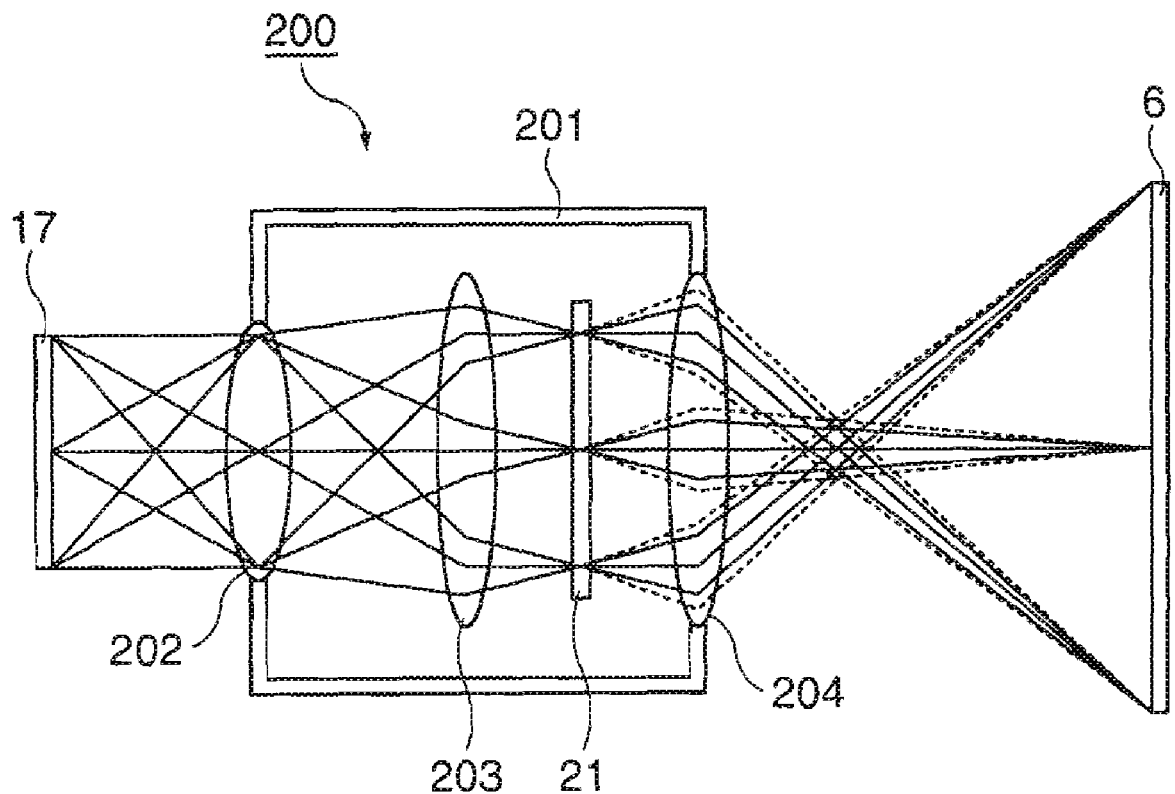
FIG. 24 is a schematic view showing a projection lens according to an eighth exemplary embodiment.

FIG. 24 is a schematic block diagram showing a projection lens of this embodiment. Further, FIG. 25 is a schematic block diagram showing a modification of the projection lens. In FIGS. 24 and 25, in order to express a focus state of light, the dichroic prism is not shown, and only one spatial light modulation device is shown.

As shown in FIG. 24, in a projection lens 200 of this embodiment, an incident-side lens 202, a lens 203, and an emergent-side lens 204 are housed in a lens barrel 201. Light incident on the projection lens 200 from the spatial light modulation device 17 is focused in the projection lens 200 by the incident-side lens 202 and the lens 203, and forms an intermediate image. Further, a light diffusing unit 21 of the scintillation removing apparatus is disposed on an image plane where the intermediate image in the projection lens 200 is formed. The configuration of the scintillation removing apparatus is the same as the first to seventh exemplary embodiments, and the description thereof will be omitted. Accordingly, the scintillation removing apparatus is also housed in the lens barrel 201. Light that transmits the light diffusing unit 21 passes through the emergent-side lens 204 and then is focused on the screen 6.

Since it is configured such that the intermediate image is formed on the light diffusing unit 21, as indicated by a broken line in FIG. 24, light that is diffused by the light diffusing unit 21 can be focused on the screen 6. Therefore, according to this configuration, scintillation can be effectively removed without degrading image quality, and a high-quality image can be obtained. Moreover, the configuration of the projection lens 200 is not limited to a projection lens having three lenses. The number of lenses of the projection lens may be arbitrarily selected insofar as light can be focused on the light diffusing unit 21 of the scintillation removing apparatus.

Next, a modification of the projection lens of this embodiment will be described with reference to FIG. 25.

Figure 25:
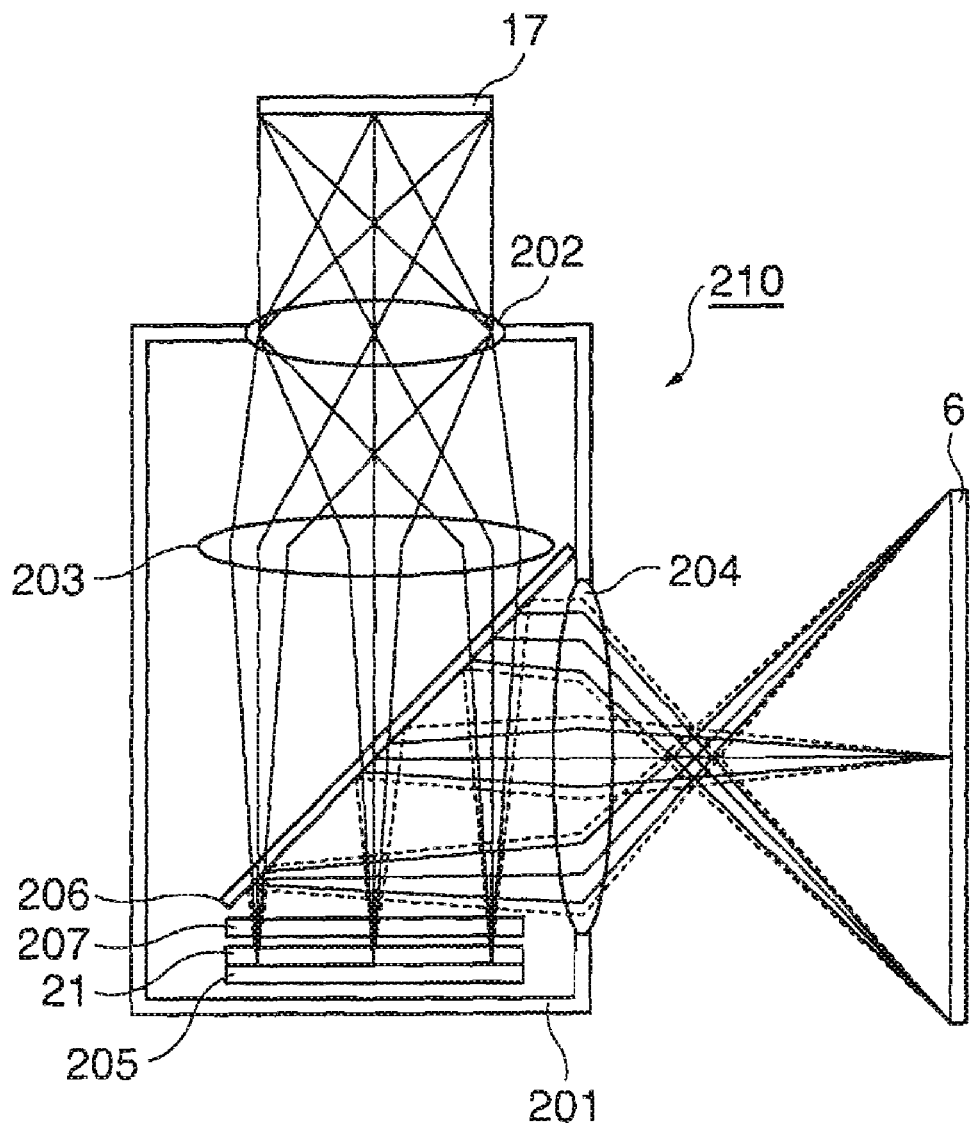
FIG. 25 is a schematic view showing a modification of a projection lens according to the eighth exemplary embodiment.

As shown in FIG. 25, a projection lens 210 of this example has a reflecting unit 205 in the lens barrel 201, and the light diffusing unit 21 of the scintillation removing apparatus is disposed near the reflecting unit 205. The reflecting unit 205 is disposed at a position where the intermediate image of the spatial light modulation device 17 is focused by the incident-side lens 202 and the lens 203. A reflective polarizing plate 206, a λ/4 retardation film 207, and the light diffusing unit 21 of the scintillation removing apparatus are sequentially provided from the light incident side between the lens 203 and the reflecting unit 205.

The surface of the reflective polarizing plate 206 is disposed to be oblique at approximately 45° with respect to a principal ray of light from the lens 203. The reflective polarizing plate 206 transmits polarized light in a first vibration direction and reflects polarized light in a second vibration direction substantially perpendicular to the first vibration direction. As the reflective polarizing plate 206, for example, a wire grid type polarizing plate may be used. In the wire grid type polarizing plate, thin lines (wires) formed of a metal, such as aluminum or the like, are formed in stripe shapes on an optically transparent substrate, for example, a substrate, such as glass or the like. The wire grid type polarizing plate transmits polarized light having a vibration direction substantially perpendicular to the wires and reflects polarized light having a vibration direction substantially parallel to the wires. If the wire grid type polarizing plate is disposed such that the wires are substantially perpendicular to a vibration direction of specific polarized light, only polarized light having a specific vibration direction can transmit the wire grid type polarizing plate. As the reflective polarizing plate 260, in addition to the wire grid type polarizing plate, a polarization beam splitter having a polarizing separation film may be used.

The scintillation removing apparatus has the same configuration as the first to seventh exemplary embodiments In this exemplary embodiment, the scintillation removing apparatus is housed in the lens barrel 201. Light incident from the incident-side lens 202 transmits the reflective polarizing plate 206, then is reflected by the reflecting unit 205, and subsequently is reflected by the reflective polarizing plate 206. Then, the optical path is bent at approximately 90°. The emergent-side lens 204 is disposed at a position where light having the bent optical path is incident, Here, if linearly polarized light in a first vibration direction emitted from the spatial light modulation device 17 is p polarized light, p polarized light transmits the reflective polarizing plate 206, and is converted into circularly polarized light by the λ/4 retardation film 207. Circularly polarized light emitted from the λ/4 retardation film 207 transmits the light diffusing unit 21 of the scintillation removing apparatus and then is incident on the reflecting unit 205. In addition, circularly polarized light reflected by the reflecting unit 205 transmits the light diffusing unit 21 of the scintillation removing apparatus, and then is converted into s polarized light, which is linearly polarized light in a second vibration direction, by the λ/4 retardation film 207. s polarized light emitted from the λ/4 retardation film 207 is reflected by the reflective polarizing plate 206, then passes through the emergent-side lens 204, and subsequently is focused on the screen 6.

The light diffusing unit 21 of the scintillation removing apparatus is disposed near a light incident surface of the reflecting unit 205 as an image plane, on which an intermediate image in the projection lens 210 is formed. Since the light diffusing unit 21 of the scintillation removing apparatus is disposed very close to the reflecting unit 205, as indicated by a broken line in FIG. 25, light that is diffused by the light diffusing unit 21 can be focused on the screen 6. Further, in this example, since light passes through the light diffusing unit 21 two times, a degree of diffusion of light can be increased. For this reason, in the scintillation removing apparatus of this example, even though the amplitude of the vibration of the light diffusing unit 21 is made small to half of the optimum amplitude, light can be diffused to the same extent as that when light passes through the light diffusing unit 21 once. For this reason, according to this example, excellent silence, power saving, and reliability can be obtained. Further, in this example, among the light components that pass through the λ/4 retardation film 207 and then are incident on the light diffusing unit 21, a light component reflected at the surface of the light diffusing unit 21 can be incident on the reflective polarizing plate 206 to be then reused. Therefore, use efficiency of light can be improved.

For example, in this modification, instead of the transmissive light diffusing unit 21 and the reflecting unit 205, a reflective light diffusing unit may be used. In this case, the reflecting unit 205 may not be needed. In the above embodiments, the transmissive light diffusing unit that diffuses light when light transmits the light diffusing unit is used. In contrast, in the reflective light diffusing unit, when a vibration is applied from the vibration generating unit and light is reflected by a diffusing plate, the phase of light can be changed. As such a diffusing plate, a high reflective member, such as aluminum or the like, on which a diffusion treatment, for example, of forming minute convexo-concaves on a reflecting surface, is performed, may be used. In this case, like a case where the transmissive light diffusing unit is used, scintillation can be effectively removed.

Ninth Exemplary Embodiment

Hereinafter, a ninth exemplary embodiment will be described with reference to FIG. 26.

In this exemplary embodiment, the basis configuration of the entire rear type projector is the same as the first exemplary embodiment. In the first to seventh exemplary embodiments, an example where the scintillation removing apparatus is disposed in the optical engine unit has been described and, in the eighth embodiment, an example where a scintillation removing apparatus is disposed in the projection lens has been described. However, in this exemplary embodiment, a description will be given for an example where a scintillation removing apparatus is disposed on an incident side of a screen.

Figure 26:
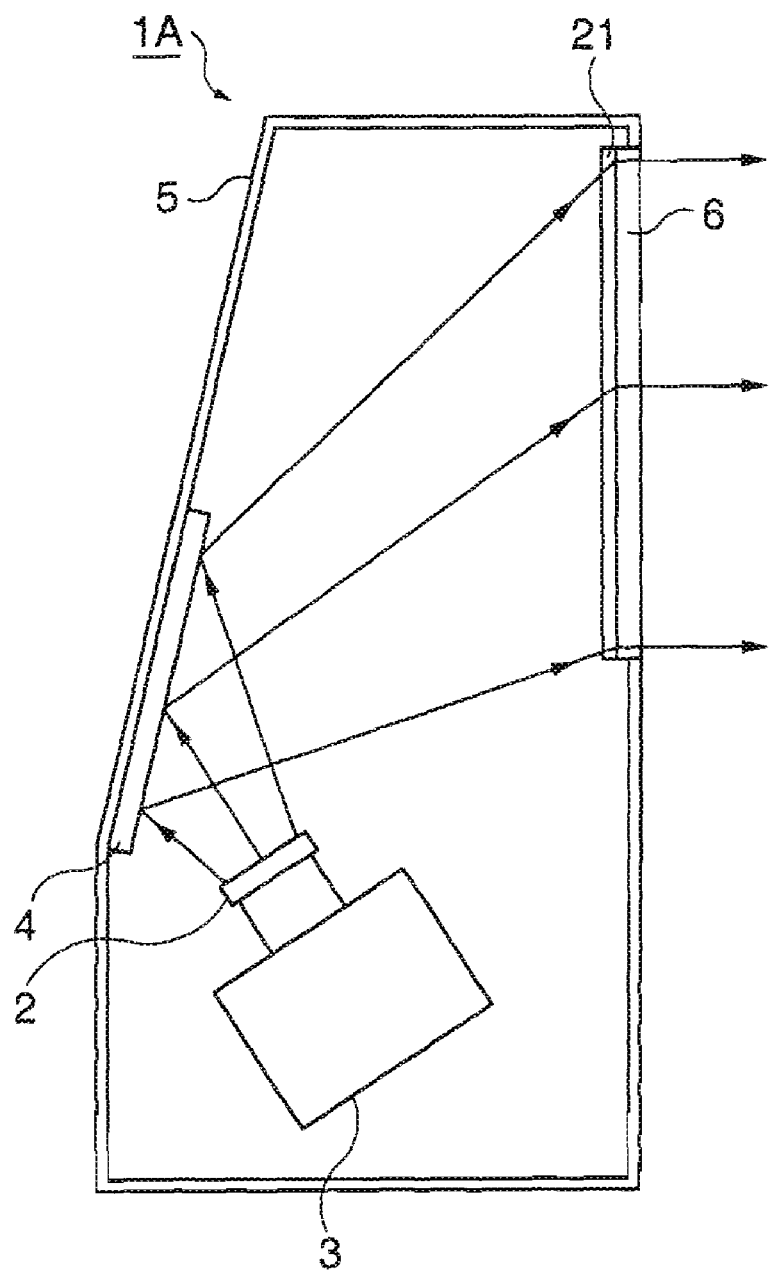
FIG. 26 is a schematic block diagram of a rear type projector according to a ninth exemplary embodiment.

FIG. 26 corresponds to FIG. 1 of the first exemplary embodiment and is a schematic block diagram of a rear type projector. In FIG. 26, the same parts as those in FIG. 1 are represented by the same reference numerals, and the descriptions thereof will be omitted.

As shown in FIG. 26, in a rear type projector 1A of this embodiment, a light diffusing unit 21 of a scintillation removing apparatus is disposed on the incident side of the screen 6 on which an image of a spatial light modulation device is focused. The scintillation removing apparatus has the same configuration as the above embodiments. If the light diffusing unit 21 is disposed at a position as close to the screen 6 as possible, an influence on focusing on the screen 6 by the diffusion of light in the light diffusing unit 21 can be reduced. Accordingly, scintillation can be effectively removed without degrading image quality, and a high-quality image can be provided. Moreover, the light diffusing unit 21 of the scintillation removing apparatus may be disposed on the emergent side of the screen 6 or may be disposed on at least one of the incident side and the emergent side.

Tenth Exemplary Embodiment

Hereinafter, a tenth exemplary embodiment will be described with reference to FIG. 27.

In this exemplary embodiment, an example of a color sequential type projector is shown.

Figure 27:
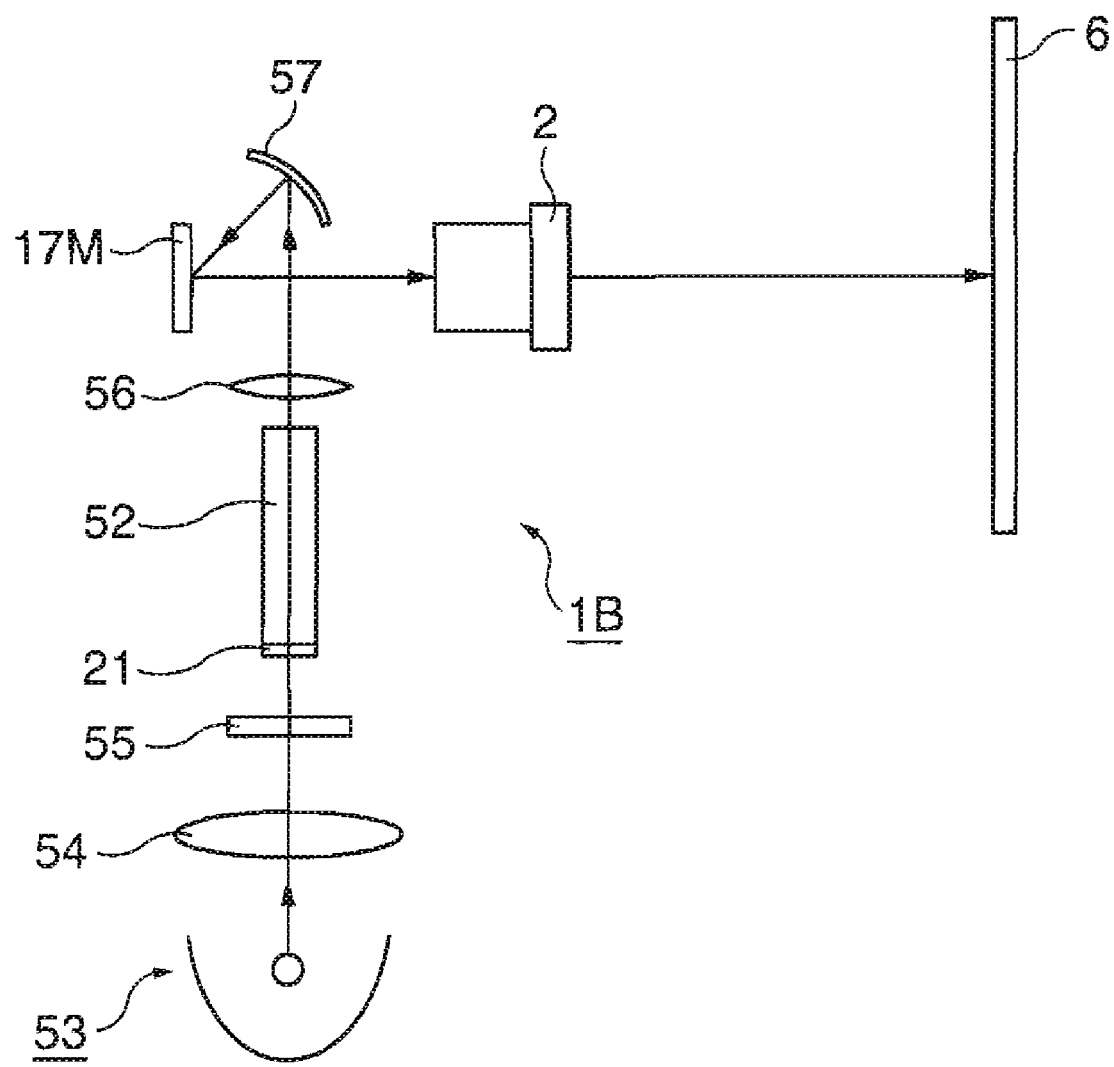
FIG. 27 is a schematic block diagram of a projector according to a tenth exemplary embodiment.

FIG. 27 is a schematic block diagram of a projector of this embodiment.

As shown in FIG. 27, a projector 1B of this embodiment includes a minute mirror array device 17M as a spatial light modulation device. Further, a light diffusing unit 21 of a scintillation removing apparatus is provided on an incident side of a rod integrator 52 serving as an intensity uniformizing unit. An ultrahigh pressure mercury lamp 53 serving as a light source unit emits white light including red, green, blue light components. Light emitted from the ultrahigh pressure mercury lamp 53 passes through a condensing lens 54 and then is incident on a color wheel 55.

In the color wheel 55, a rotator having combined therewith a dichroic film is provided to be rotatable around a rotary shaft substantially parallel to an optical axis. The dichroic film transmits light of a specific wavelength region and reflects light of other wavelength regions. For example, the color wheel 55 that includes a red light transmissive dichroic film selectively transmitting red light, a green light transmissive dichroic film selectively transmitting green light, and a blue light transmissive dichroic film selectively transmitting blue light may be used. In this case, white light emitted from the ultrahigh pressure mercury lamp 53 can be separated into red, green, and blue light components.

Light emitted from the color wheel 55 transmits the light diffusing unit 21 of the scintillation removing apparatus and then is incident on the rod integrator 52. The rod integrator 52 is formed of transparent glass having a rectangular solid shape. Light incident on the rod integrator 52 travels inside the rod integrator 52 while repeating total reflection at an interface between glass and air. With this operation, the rod integrator 52 uniformizes an intensity distribution of incident light fluxes within a plane perpendicular to the optical axis. The rod integrator 52 is not limited to a solid member formed of glass, but it may be formed of a hollow member having an inner surface as a reflecting surface.

Light emitted from the rod integrator 52 passes through a collimator lens 56 and an aspheric mirror 57 and then is incident on the minute mirror array device 17M. Light that is modulated by the minute mirror array device 17M according to the image signal and reflected toward the projection lens 2 is projected on the screen 6 by the projection lens 2.

As described above, in the projector 1B of this embodiment, the light diffusing unit 21 of the scintillation removing apparatus is disposed near the incident surface of the rod integrator 52. The scintillation removing apparatus has the same configuration as the above embodiments. With the condensing lens 54, a light source image is formed on the incident surface of the rod integrator 52. Accordingly, if the light diffusing unit 21 is disposed to a position as close to the incident surface of the rod integrator 52 as possible, a bad influence on focusing on the screen 6 by the diffusion of light in the light diffusing unit 21 can be reduced. Therefore, scintillation can be effectively removed without degrading image quality, and a high-quality image can be provided. Moreover, the light diffusing unit 21 of the scintillation removing apparatus may be provided on the emergent side of the rod integrator 52 or may be provided on at least one of the incident side and the emergent side.

Moreover, the technical scope of the invention is not limited to the above embodiments, but various modifications can be made within the scope without departing from the spirit of the invention. For example, in the above embodiments, as the configuration of the scintillation removing apparatus, when the piezoelectric elements are provided on both sides of the light diffusing unit, that is, on the incident and emergent sides of the light diffusing unit, the two piezoelectric elements have the diffusing plate frame as the common first electrode. Alternatively, the diffusing plate frame may be formed of an insulator, and piezoelectric elements each having a set of a first electrode, a piezoelectric body, and a second electrode may be provided on both sides of the diffusing plate flame.

In the above embodiments, ±V voltages are applied to the second electrodes 33 of the first and second piezoelectric elements, and the first electrode 29 or 62 is connected to the ground through the diffusing plate frame 25 (that is, 0 V is applied to the first electrode 29 or 62). However, the voltages to be applied to the electrodes are not limited thereto. For example, ±V voltages may be applied to the first electrode 29 or 62, and 0 V may be applied to the second electrodes 33 of the first and second piezoelectric elements. Further, voltages having the same polarity and a polarity opposite to the first electrode 29 or 62 may be applied to the second electrodes 33 of the first and second piezoelectric elements. That is, AC signals whose phases are inverted to each other may be supplied to the first electrode 29 or 62 and the second electrodes 33 by the driving units 34 or 34a, 34b, 34c, and 34d, such that the potential of the first electrode 29 or 62 and the potentials of the second electrodes 33 are −V and +V or +V and −V, respectively. Therefore, the invention is not limited to the configuration in which the diffusing plate frame is connected to the ground, as shown in FIG. 3 and the like. If such a voltage application method is adopted, a potential difference between both electrodes can be made large, compared with a case where 0 V is applied to one electrode (that is, one electrode is connected to the ground). As a result, a degree of deformation of each of the piezoelectric elements 30 and 31 can be made large.

As for the specific configuration of the position, the number, the shape, and the material of the vibration generating unit or the support, and the specific configuration of the shape and material of the diffusing plate or the diffusing plate frame, various modifications can be suitably made, in addition to those described in the above embodiments. For example, as the diffusing plate, a diffusing plate that transmits and diffuses light (front scattering type) or a diffusing plate that reflects and diffuses light (rear scattering type) may be used.

As described in the ninth exemplary embodiment, in a case where the configurational in which the light diffusing unit of the scintillation removing apparatus is provided on the incident side or emergent side of the screen is regarded as a screen device, a scintillation removing apparatus can be applied to a screen alone. Alternatively, a light diffusing unit itself of the scintillation removing apparatus may be used as a screen. In addition, a front type projector, in addition to the rear type projector shown in the exemplary embodiments may be used. In this case, as described above, if the scintillation removing apparatus is provided in the screen, a general front type projector can be used as a projector main body. The scintillation removing apparatus may be incorporated into the front projector main body. Further, when a laser light source having high light interference is used as a light source of a projector, the scintillation removing apparatus according to the ninth exemplary embodiment is particularly effective. Of course, a scintillation removing apparatus may be incorporated into a projector that uses a light source other than the laser light source, for example, an ultrahigh pressure mercury lamp or a light-emitting diode light source.

As the spatial light modulation device, a reflective liquid crystal display device (for example, LCOS (Liquid Crystal On Silicon)) or a projection device (for example, GLV (Grating Light Valve)) that controls the direction or color of light using a light diffraction effect may be used. Further, a projector that scans laser light modulated according to an image signal so as to form an image, a so-called laser projector may also be used. In case of the laser projector, instead of the optical engine unit in the above embodiments, a laser light source that emits laser light modulated according to an image signal, and a scanning optical system that scans light from the laser light source are provided.

What is claimed is:

1. A projector comprising:
    a light diffusing unit that is vibratably provided to diffuse incident light by a vibration and to emit diffused light, the light diffusing unit having a unique resonance frequency, the light diffusing unit displaying an image using the diffused light emitted from the light diffusing unit, and the light diffusing unit comprising a frame;
    a vibration generating unit that has a piezoelectric element for vibrating at least the frame of the light diffusing unit; and
    a control unit that controls the vibration generating unit to vibrate the light diffusing unit at a frequency corresponding to the unique resonance frequency of the light diffusing unit.

2. The projector according to claim 1, a plurality of vibration generating units being provided.

3. The projector according to claim 2, the plurality of vibration generating units including a first vibration generating unit and a second vibration generating unit, a first vibration direction of the first vibration generating unit being perpendicular to a second vibration direction of the second vibration generating unit with respect to a principal plane of the light diffusing unit.

4. The projector according to claim 3,
    the frame being vibratable in a first direction,
    the light diffusing unit further comprising a light diffusing unit main body that is vibratable in a second direction perpendicular to the first direction and relatively with respect to the frame, and
    the vibration generating units respectively vibrating the frame and the light diffusing unit main body.

5. The projector according to claim 2, driving signals having waveforms out of phase being respectively input to the piezoelectric elements of at least a first vibration generating unit and a second vibration generating unit among the plurality of vibration generating units.

6. The projector according to claim 5, the relationship $f1 = n \times f2$ being satisfied, where n is a natural number of 1 or more, being satisfied, f1 being a first excitation frequency of the first vibration generating unit and f2 being a second excitation frequency of the second vibration generating unit.

7. The projector according to claim 1, the light diffusing unit having a plurality of resonance frequencies corresponding to different vibration modes.

8. The projector according to claim 7, the plurality of resonance frequencies being approximately the same.

9. The projector according to claim 1, the unique resonance frequency of the light diffusing unit being 20 kHz or more.

10. The projector according to claim 1, the light diffusing unit being rotatable with a support member as a fulcrum, the support member being disposed at a position where a vibration node of the light diffusing unit is disposed.

11. The projector according to claim 1, the vibration generating unit having a fixed end outside of the light diffusing unit, a vibration being applied to the light diffusing unit from the vibration generating unit outside the light diffusing unit.

12. The projector according to claim 1,
    the vibration generating unit being provided close to a light incident surface and a light emergent surface of the light diffusing unit and not having a fixed end outside the light diffusing unit.

13. A screen comprising:
    a light diffusing unit that is vibratably provided to diffuse incident light by a vibration and to emit diffused light, the light diffusing unit having a unique resonance frequency, and the light diffusing unit comprising at least one of a frame and a main body;
    a vibration generating unit that has a piezoelectric element for vibrating the at least one of the frame and the main body of the light diffusing unit; and
    a control unit that controls the vibration generating unit to vibrate the light diffusing unit at a frequency corresponding to the unique resonance frequency of the light diffusing unit.

14. A projector system comprising:
the screen according to claim 13; and
a projector main body that projects image light on the screen.

15. A scintillation removing apparatus comprising:
a light diffusing unit that is vibratably provided to diffuse incident light by a vibration and to emit diffused light, the light diffusing unit having a unique resonance frequency, and the light diffusing unit comprising at least one of a frame and a main body;
a vibration generating unit that has a piezoelectric element for vibrating the at least one of the frame and the main body of the light diffusing unit; and
a control unit that controls the vibration generating unit to vibrate the light diffusing unit at a frequency corresponding to the unique resonance frequency of the light diffusing unit.

16. A scintillation removing apparatus for use with a casing, comprising:
a light diffusing unit that diffuses light, the light diffusing unit comprising at least one of a frame and a main body;
at least one support member that supports the light diffusing unit within the casing;
a vibration generating unit including a piezoelectric element that vibrates the at least one of the frame and the main body of the light diffusing unit;
a control signal generating unit that stores a unique frequency of the light diffusing unit and generates a control signal to vibrate the vibration generating unit at the unique frequency of the light diffusing unit; and
a driving unit that receives the control signal from the control signal generating unit and supplies a driving voltage to vibrate the vibration generating unit.

17. The scintillation removing apparatus according to claim 16, the at least one support member being formed of an elastic material.

18. The scintillation removing apparatus according to claim 16, the at least one support member vibratably supporting the light diffusing unit such that the light diffusing unit does not come into contact with the casing.

19. The scintillation removing apparatus according to claim 16, the at least one support member being disposed at a position where a vibration node of a light diffusing unit is disposed.

* * * * *